(12) United States Patent
Nie et al.

(10) Patent No.: US 10,963,682 B2
(45) Date of Patent: Mar. 30, 2021

(54) SKELETON POSTURE DETERMINING METHOD AND APPARATUS, AND COMPUTER READABLE STORAGE MEDIUM

(71) Applicant: Huawei Technologies Co., Ltd., Shenzhen (CN)

(72) Inventors: Qiang Nie, Hong Kong (CN); Yixin Wu, Shenzhen (CN); Yunhui Liu, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/390,835

(22) Filed: Apr. 22, 2019

(65) Prior Publication Data
US 2019/0251341 A1   Aug. 15, 2019

Related U.S. Application Data

(63) Continuation of application No. PCT/CN2018/110135, filed on Oct. 12, 2018.

(30) Foreign Application Priority Data

Dec. 8, 2017 (CN) .................. 201711297623.X

(51) Int. Cl.
*G06T 7/73* (2017.01)
*G06K 9/00* (2006.01)
*G06T 7/593* (2017.01)

(52) U.S. Cl.
CPC ..... *G06K 9/00348* (2013.01); *G06K 9/00355* (2013.01); *G06K 9/00362* (2013.01);
(Continued)

(58) Field of Classification Search
CPC combination set(s) only.
See application file for complete search history.

(56) References Cited

U.S. PATENT DOCUMENTS 8,761,437 B2 * 6/2014 Kirovski ............ G06K 9/00342
382/103
8,929,600 B2   1/2015 Liu et al.
(Continued)

FOREIGN PATENT DOCUMENTS

CN   101782968 A   7/2010
CN   102178530 A   9/2011
(Continued)

OTHER PUBLICATIONS

Machine Translation and Abstract of Chinese Publication No. CN101782968, Jul. 21, 2010, 21 pages.
(Continued)

*Primary Examiner* — Tsung Yin Tsai
(74) *Attorney, Agent, or Firm* — Conley Rose, P.C.

(57) ABSTRACT

A skeleton posture determining method and apparatus, and a computer readable storage medium belong to the field of human body posture recognition, where the method includes obtaining a first skeleton posture including location information of a plurality of joints, determining a description parameter of at least one target joint of the joints, obtaining, through screening, a correct joint from the at least one target joint based on the description parameter, and performing fitting based on location information of the correct joint to obtain a second skeleton posture, where the second skeleton posture includes location information of at least one joint, and the at least one target joint is in a one-to-one correspondence with the at least one joint. Hence, the method, the apparatus, and the computer readable storage medium can improve recognition accuracy of a human body posture.

30 Claims, 7 Drawing Sheets

(52) U.S. Cl.
CPC ..... *G06K 9/00369* (2013.01); *G06K 9/00744* (2013.01); *G06T 7/593* (2017.01); *G06T 7/75* (2017.01)

(56) References Cited

U.S. PATENT DOCUMENTS

| | | | | |
|---|---|---|---|---|
| 9,984,461 | B2* | 5/2018 | Tang | G06K 9/00214 |
| 2008/0112592 | A1* | 5/2008 | Wu | A61B 5/1116 382/103 |
| 2009/0080780 | A1* | 3/2009 | Ikeda | G06K 9/00369 382/209 |
| 2010/0182329 | A1* | 7/2010 | Yamaguchi | G06T 13/40 345/474 |
| 2012/0190505 | A1* | 7/2012 | Shavit | G09B 19/0038 482/8 |
| 2013/0195330 | A1* | 8/2013 | Kim | G06K 9/00201 382/128 |
| 2013/0230211 | A1* | 9/2013 | Tanabiki | G06T 7/75 382/103 |
| 2014/0169623 | A1* | 6/2014 | Liu | G06K 9/00335 382/103 |

FOREIGN PATENT DOCUMENTS

| | | | |
|---|---|---|---|
| CN | 104463118 | A | 3/2015 |
| CN | 104715493 | A | 6/2015 |
| CN | 104758096 | A | 7/2015 |
| CN | 105653887 | A | 6/2016 |
| CN | 105869181 | A | 8/2016 |
| CN | 106022213 | A | 10/2016 |
| CN | 106842954 | A | 6/2017 |
| CN | 106971050 | A | 7/2017 |
| CN | 107220596 | A | 9/2017 |
| CN | 107833271 | A | 3/2018 |
| CN | 108229332 | A | 6/2018 |

OTHER PUBLICATIONS

Machine Translation and Abstract of Chinese Publication No. CN102178530, Sep. 14, 2011, 17 pages.
Machine Translation and Abstract of Chinese Publication No. CN104463118, Mar. 25, 2015, 18 pages.
Machine Translation and Abstract of Chinese Publication No. CN104715493, Jun. 17, 2015, 8 pages.
Machine Translation and Abstract of Chinese Publication No. CN104758096, Jul. 8, 2015, 9 pages.
Machine Translation and Abstract of Chinese Publication No. CN105653887, Jun. 8, 2016, 10 pages.
Machine Translation and Abstract of Chinese Publication No. CN105869181, Aug. 17, 2016, 10 pages.
Machine Translation and Abstract of Chinese Publication No. CN106022213, Oct. 12, 2016, 17 pages.
Machine Translation and Abstract of Chinese Publication No. CN106842954, Jun. 13, 2017, 16 pages.
Machine Translation and Abstract of Chinese Publication No. CN106971050, Jul. 21, 2017, 15 pages.
Machine Translation and Abstract of Chinese Publication No. CN107220596, Sep. 29, 2017, 16 pages.
Machine Translation and Abstract of Chinese Publication No. CN107833271, Mar. 23, 2018, 16 pages.
Machine Translation and Abstract of Chinese Publication No. CN108229332, Jun. 29, 2018, 47 pages.
"Euler angles," Retrieved from the internet: https://baike.baidu.com/item/%E6%AC%A7%E6%8B%89%E8%A7%92/1626212?fr=aladdin on May 9, 2019, 3 pages.
English Translation of "Euler angles," Retrieved from the internet: https://baike.baidu.com/item/%E6%AC%A7%E6%8B%89%E8%A7%92/1626212?fr=aladdin on May 9, 2019, 7 pages.
Foreign Communication From a Counterpart Application, Chinese Application No. 201711297623.X, Chinese Office Action dated Apr. 26, 2019, 7 pages.
Foreign Communication From a Counterpart Application, PCT Application No. PCT/CN2018/110135, English Translation of International Search Report dated Dec. 28, 2018, 3 pages.
Herda, L., "Using Biomechanical Constraints to Improve Video-Based Motion Capture," XP055628720, PhD Thesis, Jan. 1, 2003, 231 pages.
Foreign Communication From a Counterpart Application, European Application No. 18855108.9, Extended European Search Report dated Oct. 14, 2019, 8 pages.

* cited by examiner

US 10,963,682 B2

SKELETON POSTURE DETERMINING METHOD AND APPARATUS, AND COMPUTER READABLE STORAGE MEDIUM

CROSS-REFERENCE TO RELATED APPLICATIONS

This application is a continuation of International Patent Application No. PCT/CN2018/110135 filed on Oct. 12, 2018, which claims priority to Chinese Patent Application No. 201711297623.X filed on Dec. 8, 2017. The disclosures of the aforementioned applications are hereby incorporated by reference in their entireties.

TECHNICAL FIELD

This application relates to the field of human body posture recognition, and in particular, to a skeleton posture determining method and apparatus, and a computer readable storage medium.

BACKGROUND

Accurately recognizing a human body motion by an electronic device is a premise of successful interaction between the electronic device and a user. For example, for a service-oriented robot, accurately recognizing a motion that a user is dining is a premise for the robot to clear a dining table for the user. A human body motion usually includes a series of human body postures. Therefore, accurately recognizing a human body posture plays an important role in recognizing the human body motion.

In a related technology, an electronic device may photograph a human body motion to obtain a human body motion video, and then may abstract a human body posture image included in each video frame of the motion video to obtain a human body skeleton posture. The skeleton posture includes location information of a plurality of joints, and a human body posture can be recognized by recognizing the skeleton posture.

In a process of implementing this application, the inventor finds that the other approaches may have at least the following problem.

In actual application, abstraction of the human body posture image may be interfered with by a plurality of factors, for example, by clothes worn by a user in the human body posture image or by a shelter. Due to interference by the plurality of factors, location information of a plurality of joints that is reflected by a skeleton posture obtained by abstracting a human body posture image may include location information of some erroneous joints, and a recognition error may be caused by recognizing a human body posture using such skeleton postures. As a result, human body posture recognition accuracy is affected.

SUMMARY

Embodiments of this application provide a skeleton posture determining method and apparatus, and a computer readable storage medium. Technical solutions provided in the embodiments of this application can improve recognition accuracy of a human body posture. The technical solutions provided in the embodiments of this application are as follows.

According to a first aspect, a skeleton posture determining method is provided, where the method includes obtaining a first skeleton posture, where the first skeleton posture includes location information of a plurality of joints, determining a description parameter of at least one target joint of the plurality of joints, where the description parameter includes location information of each of the at least one target joint, obtaining, through screening, a correct joint from the at least one target joint based on the description parameter, and performing fitting based on location information of the correct joint to obtain the second skeleton posture, where the second skeleton posture includes location information of at least one joint, and the at least one target joint is in a one-to-one correspondence with the at least one joint.

The first skeleton posture is obtained, where the first skeleton posture includes the location information of the plurality of joints, the location information of the correct joint is obtained from the first skeleton posture through screening, and the second skeleton posture is obtained by performing fitting using the location information of the correct joint. This can ensure that the second skeleton posture does not include location information of an erroneous joint. Therefore, accuracy of recognizing a human body posture using the second skeleton posture is relatively high.

Optionally, the description parameter further includes angular information of a target joint, having a child joint, of the at least one target joint, angular information of a first joint is used to indicate a rotation angle of a skeleton between the first joint and each of k child joints relative to the first joint, the first joint is any target joint, having a child joint, of the at least one target joint, and the first joint has the k child joints, where k is a positive integer greater than or equal to 1.

Optionally, a rotation angle of a skeleton a between the first joint and an $i^{th}$ child joint of the k child joints relative to the first joint includes a first Euler angle, a second Euler angle, and a third Euler angle, where $1 \leq i \leq k$, and the first Euler angle is an angle formed by rotating the skeleton a around an x-axis in a local coordinate system of the first joint, the second Euler angle is an angle formed by rotating the skeleton a around a y-axis in the local coordinate system, and the third Euler angle is an angle formed by rotating the skeleton a around a z-axis in the local coordinate system.

Using the Euler angles to represent the rotation angle of the skeleton a relative to the first joint enables viewpoint invariance for the rotation angle, to be specific, the rotation angle does not vary with a location change of a stereoscopic camera.

Optionally, the first skeleton posture further includes location information of a spine, and the plurality of joints include a head joint, an origin of the local coordinate system is a central point of the first joint, and when the first joint has a second-level parent joint, a direction of the y-axis is a direction from the first joint to a parent joint of the first joint, a direction of the z-axis is a direction of a cross product of a unit direction vector of the y-axis and a unit direction vector of a vector directed from the parent joint of the first joint to the second-level parent joint of the first joint, and a direction of the x-axis is a direction of a cross product of the unit direction vector of the y-axis and a unit direction vector of the z-axis, or when the first joint does not have a second-level parent joint, but has a parent joint, a direction of the y-axis is a direction from the first joint to the parent joint of the first joint, the z-axis is parallel to the spine, and points to the head joint, and a direction of the x-axis is a direction of a cross product of a unit direction vector of the y-axis and a unit direction vector of the z-axis.

Optionally, a projected angle of the first Euler angle, a projected angle of the second Euler angle, and a projected angle of the third Euler angle are calculated based on a first formula group, and the first formula group is:

$$\begin{cases} \alpha_{ijk} = \text{sign}(\alpha) \times \cos^{-1}\left(\frac{\vec{n}_y \cdot \overrightarrow{prj_x(J_j J_i)}}{\|\overrightarrow{prj_x(J_j J_i)}\|}\right) \\ \beta_{ijk} = \text{sign}(\beta) \times \cos^{-1}\left(\frac{\vec{n}_z \cdot \overrightarrow{prj_y(J_j J_i)}}{\|\overrightarrow{prj_y(J_j J_i)}\|}\right), \\ \gamma_{ijk} = \text{sign}(\gamma) \times \cos^{-1}\left(\frac{\vec{n}_x \cdot \overrightarrow{prj_z(J_j J_i)}}{\|\overrightarrow{prj_z(J_j J_i)}\|}\right) \end{cases}$$

$$\text{sign}(\alpha) = \begin{cases} 1, & \frac{\vec{n}_y \times \overrightarrow{prj_x(J_j J_i)}}{\|\vec{n}_y \times \overrightarrow{prj_x(J_j J_i)}\|} = \vec{n}_x \\ -1, & \frac{\vec{n}_y \times \overrightarrow{prj_x(J_j J_i)}}{\|\vec{n}_y \times \overrightarrow{prj_x(J_j J_i)}\|} = -\vec{n}_x \end{cases},$$

$$\text{sign}(\beta) = \begin{cases} 1, & \frac{\vec{n}_z \times \overrightarrow{prj_y(J_j J_i)}}{\|\vec{n}_z \times \overrightarrow{prj_y(J_j J_i)}\|} = \vec{n}_y \\ -1, & \frac{\vec{n}_z \times \overrightarrow{prj_y(J_j J_i)}}{\|\vec{n}_z \times \overrightarrow{prj_y(J_j J_i)}\|} = -\vec{n}_y \end{cases}, \text{ and}$$

$$\text{sign}(\gamma) = \begin{cases} 1, & \frac{\vec{n}_x \times \overrightarrow{prj_z(J_j J_i)}}{\|\vec{n}_x \times \overrightarrow{prj_z(J_j J_i)}\|} = \vec{n}_z \\ -1, & \frac{\vec{n}_x \times \overrightarrow{prj_z(J_j J_i)}}{\|\vec{n}_x \times \overrightarrow{prj_z(J_j J_i)}\|} = -\vec{n}_z \end{cases},$$

where $\alpha_{ijk}$ is the projected angle of the first Euler angle, $\beta_{ijk}$ is the projected angle of the second Euler angle, $\gamma_{ijk}$ is the projected angle of the third Euler angle, $\vec{n}_x$ is a unit direction vector of the x-axis, $\vec{n}_y$ is a unit direction vector of the y-axis, $\vec{n}_z$ is a unit direction vector of the z-axis, $\overrightarrow{prj_x(J_j J_i)}$ is a projected vector of projecting a target vector to a plane yz in the local coordinate system, $\overrightarrow{prj_y(J_j J_i)}$ is a projected vector of projecting the target vector to a plane xz in the local coordinate system, $\overrightarrow{prj_z(J_j J_i)}$ is a projected vector of projecting the target vector to a plane xy in the local coordinate system, and the target vector is a vector directed from the first joint to the $i^{th}$ child joint.

In actual application, calculation of the first Euler angle, the second Euler angle, and the third Euler angle is relatively complex, and it is usually difficult to obtain a unique solution. Therefore, to simplify calculation, an electronic device may use the projected angle of the first Euler angle, the projected angle of the second Euler angle, and the projected angle of the third Euler angle to represent the first Euler angle, the second Euler angle, and the third Euler angle, respectively. The projected angle of the first Euler angle is an angle formed by projecting the skeleton a between a first projected skeleton on the plane yz in the local coordinate system and the y-axis in the local coordinate system, the projected angle of the second Euler angle is an angle formed by projecting the skeleton a between a second projected skeleton on the plane xz in the local coordinate system and the z-axis in the local coordinate system, and the projected angle of the third Euler angle is an angle formed by projecting the skeleton a between a third projected skeleton on the plane xy in the local coordinate system and the x-axis in the local coordinate system.

Optionally, the obtaining, through screening, a correct joint from the at least one target joint based on the description parameter includes determining whether an angle indicated by the angular information of the first joint falls within a preset angle range, when the angle indicated by the angular information of the first joint is beyond the preset angle range, determining that the first joint is an erroneous joint, and determining the correct joint of the at least one target joint based on the erroneous joint of the at least one target joint.

In actual application, a human joint has a specific motion range. To be specific, the human joint cannot rotate by 360 degrees, but can rotate only within a specific angle range. A joint whose rotation angle is beyond the angle range may be an erroneous joint. Therefore, in this embodiment of this application, if the angle indicated by the angular information of the first joint is beyond the preset angle range, the first joint may be removed from the at least one target joint as the erroneous joint, to finally obtain the correct joint.

It should be noted that the angle indicated by the angular information of the first joint may be the first Euler angle, the second Euler angle, and the third Euler angle, or may be the projected angle of the first Euler angle, the projected angle of the second Euler angle, and the projected angle of the third Euler angle.

When the angle indicated by the angular information of the first joint is the first Euler angle, the second Euler angle, and the third Euler angle, the preset angle range includes a first Euler angle range, a second Euler angle range, and a third Euler angle range, and determining whether an angle indicated by the angular information of the first joint falls within a preset angle range includes determining whether the first Euler angle falls within the first Euler angle range, determining whether the second Euler angle falls within the second Euler angle range, determining whether the third Euler angle falls within the third Euler angle range, and when the first Euler angle does not fall within the first Euler angle range, the second Euler angle does not fall within the second Euler angle range, or the third Euler angle does not fall within the third Euler angle range, determining that the angle indicated by the angular information of the first joint is beyond the preset angle range.

When the angle indicated by the angular information of the first joint is the projected angle of the first Euler angle, the projected angle of the second Euler angle, and the projected angle of the third Euler angle, the preset angle range includes a projected angle range of the first Euler angle, a projected angle range of the second Euler angle, and a projected angle range of the third Euler angle, and determining whether an angle indicated by the angular information of the first joint falls within a preset angle range includes determining whether the projected angle of the first Euler angle falls within the projected angle range of the first Euler angle, determining whether the projected angle of the second Euler angle falls within the projected angle range of the second Euler angle, determining whether the projected angle of the third Euler angle falls within the projected angle range of the third Euler angle, and when the projected angle of the first Euler angle does not fall within the projected angle range of the first Euler angle, the projected angle of the second Euler angle does not fall within the projected angle range of the second Euler angle, or the projected angle of the third Euler angle does not fall within the projected angle range of the third Euler angle, determining that the angle indicated by the angular information of the first joint is beyond the preset angle range.

Optionally, location information of a second joint is used to indicate three-dimensional coordinates of the second joint in a world coordinate system, and the second joint is any one of the at least one target joint.

Optionally, obtaining, through screening, a correct joint from the at least one target joint based on the description parameter includes determining a length of a skeleton between a third joint and a parent joint of the third joint based on location information of the third joint and location information of the parent joint of the third joint, where the third joint is any target joint, having a parent joint, of the at least one target joint, when the length of the skeleton between the third joint and the parent joint of the third joint is beyond a pre-obtained skeleton length range, determining that the third joint is an erroneous joint, and determining the correct joint of the at least one target joint based on the erroneous joint of the at least one target joint.

In actual application, a length of a human skeleton is usually within a specific length range. Therefore, when a length of a skeleton between the third joint and the parent joint of the third joint is beyond the pre-obtained skeleton length range, the third joint may be an erroneous joint. In this case, the third joint may be removed from the at least one target joint as an erroneous joint, to finally obtain the correct joint.

Optionally, obtaining a first skeleton posture includes obtaining a human body motion video, where the motion video includes a plurality of video frames, and each of the video frames includes a human body posture image, obtaining a depth image corresponding to each of the video frames, and obtaining the first skeleton posture based on a first depth image corresponding to a first video frame, where the first video frame is any one of the plurality of video frames.

Optionally, a pixel value of a human body posture image in the first depth image is different from a pixel value of a non-human-body posture image, and the obtaining, through screening, a correct joint from the at least one target joint based on the description parameter includes determining, based on location information of a second joint, two-dimensional coordinates of the second joint in an image coordinate system of the first depth image, where the second joint is any one of the at least one target joint, determining a pixel value sum of at least one pixel within a preset range around the two-dimensional coordinates in the first depth image, when the pixel value sum is beyond a preset pixel-value-sum range, determining that the second joint is an erroneous joint, and determining the correct joint of the at least one target joint based on the erroneous joint of the at least one target joint.

In actual application, a human joint cannot be located outside a human body. Therefore, in this embodiment of this application, two-dimensional coordinates of the second joint in an image coordinate system of the first video frame may be obtained, and a pixel value sum of at least one pixel within a preset range around the two-dimensional coordinates may be obtained. In addition, a pixel value of a human body posture image in the first video frame is different from a pixel value of a non-human-body posture image. Therefore, whether the second joint is located outside the human body can be determined using the pixel value sum of the at least one pixel within the preset range around the two-dimensional coordinates. When the pixel value sum is beyond the preset pixel-value-sum range, it can be determined that the second joint is located outside the human body. In this case, the second joint can be removed from the at least one target joint as an erroneous joint, to finally obtain the correct joint.

Optionally, the first video frame is a $t^{th}$ video frame of the plurality of video frames, where t is a positive integer greater than 1, and obtaining, through screening, a correct joint from the at least one target joint based on the description parameter includes obtaining a third skeleton posture, where the third skeleton posture is obtained based on a second depth image corresponding to a $(t-1)^{th}$ video frame of the plurality of video frames, the third skeleton posture includes location information of a plurality of preset joints, and the plurality of preset joints are in a one-to-one correspondence with the plurality of joints, obtaining location information of a fourth joint from the third skeleton posture, where the fourth joint corresponds to a second joint, and the second joint is any one of the at least one target joint, obtaining a distance between location coordinates indicated by the location information of the fourth joint and location coordinates indicated by location information of the second joint, when the distance is greater than a preset distance threshold, determining that the second joint is an erroneous joint, and determining the correct joint of the at least one target joint based on the erroneous joint of the at least one target joint.

In actual application, a motion speed of a human joint shall be within a specific speed range. Therefore, when a distance between location coordinates indicated by location information of a joint corresponding to a first skeleton posture and a third skeleton posture that are obtained in two consecutive video frames shall be within a preset distance range. To be specific, when a distance between the second joint and a fourth joint corresponding to the second joint is greater than a preset distance threshold, the second joint may be an erroneous joint. In this case, the second joint may be removed from the at least one target joint as an erroneous joint, to finally obtain the correct joint.

Optionally, the second skeleton posture includes human body orientation information, and the human body orientation information is used to indicate an orientation of a front side of a human body trunk in a human body posture corresponding to the second skeleton posture in a world coordinate system, and performing fitting based on location information of the correct joint to obtain the second skeleton posture includes obtaining location information of a first preset joint, where the first preset joint is a target joint of the at least one target joint, determining the location information of the first preset joint as location information of a second preset joint in the second skeleton posture, determining an orientation of the front side of the human body trunk in a human body posture corresponding to the first skeleton posture in the world coordinate system, as a front orientation indicated by the human body orientation information, determining a length of a skeleton between a fifth joint and a parent joint of the fifth joint based on a pre-obtained human body skeleton length set, where the fifth joint is any joint, having a parent joint, of the at least one joint, and determining location information of another joint in the second skeleton posture different from the second preset joint based on the length of the skeleton between the fifth joint and the parent joint of the fifth joint, the front orientation indicated by the human body orientation information, and the location information of the correct joint.

Optionally, the first preset joint is a root joint, the root joint is a joint that does not have a parent joint, and the second preset joint is the root joint.

Optionally, the human body orientation information includes location information of a spine and location information of two hip joints, and the front orientation indicated by the human body orientation information is a direction in which the two hip joints protrude relative to the spine.

Optionally, before the determining an orientation of the front side of the human body trunk in a human body posture corresponding to the first skeleton posture in the world coordinate system, as a front orientation indicated by the human body orientation information, the method further includes determining an orientation of a tiptoe in the human body posture corresponding to the first skeleton posture in the world coordinate system, and determining the orientation of the tiptoe in the world coordinate system as the orientation of the front side of the human body trunk in the human body posture corresponding to the first skeleton posture in the world coordinate system.

Optionally, the determining an orientation of a tiptoe in the human body posture corresponding to the first skeleton posture in the world coordinate system includes obtaining a point cloud in a human foot image of a first depth image, where the first skeleton posture is obtained based on the first depth image, projecting the point cloud onto a plane xy in the world coordinate system, where the plane xy is parallel to a plane on which the ground in the first depth image is located, obtaining a main feature vector of the projected point cloud, and determining a direction of the main feature vector as the orientation of the tiptoe in the human body posture corresponding to the first skeleton posture in the world coordinate system.

Optionally, before determining an orientation of the front side of the human body trunk in a human body posture corresponding to the first skeleton posture in the world coordinate system, as a front orientation indicated by the human body orientation information, the method further includes determining an orientation of a human face in the human body posture corresponding to the first skeleton posture in the world coordinate system, and determining the orientation of the human face in the world coordinate system as the orientation of the front side of the human body trunk in the human body posture corresponding to the first skeleton posture in the world coordinate system.

Optionally, the determining location information of another joint in the second skeleton posture different from the second preset joint based on the length of the skeleton between the fifth joint and the parent joint of the fifth joint, the front orientation indicated by the human body orientation information, and the location information of the correct joint includes determining, based on the front orientation indicated by the human body orientation information, angle range information of a joint, having a child joint, of the other joint that is in the at least one joint and that is different from the second preset joint, under a first constraint and a second constraint, performing fitting based on a second formula to obtain angular information of a specified joint obtained when a reference value is the smallest, where the second formula is:

$$y = \sum_{i=0}^{n} \left[ \omega_i (PJ_{i,t}^0 - PJ_{i,t}^{ob})^2 + (1 - \omega_i) \| OJ_{j,t}^0 - OJ_{j,t-1}^0 \|^2 \right],$$

where y is the reference value, and the reference value is used to represent a similarity between the second skeleton posture and the first skeleton posture, $PJ_{i,t}^{ob}$ is location information of an $i^{th}$ target joint, different from the first preset joint, of the at least one target joint, $PJ_{i,t}^0$ is location information of a specified joint in the second skeleton posture, where the specified joint is a joint corresponding to the $i^{th}$ target joint, $OJ_{j,t}^0$ is angular information of a parent joint of the specified joint, and $OJ_{j,t-1}^0$ is angular information of a parent joint of a joint, corresponding to the specified joint, in a fourth skeleton posture, where the fourth skeleton posture is obtained by performing fitting based on a third skeleton posture, the third skeleton posture is obtained based on a previous video frame of a video frame corresponding to the first skeleton posture, and when the $i^{th}$ target joint is the correct joint, $\omega_i$ is equal to 1, or when the $i^{th}$ target joint is not the correct joint, $\omega_i$ is equal to 0, where n is a quantity of joints, different from the second preset joint, of the at least one joint, and determining the location information of the specified joint based on the angular information of the specified joint and a length of a skeleton between the specified joint and the parent joint of the specified joint, where the first constraint is the angular information of the specified joint obtained through fitting ensures that an angle indicated by the angular information of the parent joint of the specified joint falls within an angle range indicated by angle range information of the parent joint of the specified joint, and the second constraint is the angular information of the specified joint obtained through fitting ensures that the length of the skeleton between the specified joint and the parent joint of the specified joint is equal to a length of a skeleton between the specified joint and the parent joint of the specified joint in the pre-obtained human body skeleton length set.

The electronic device may obtain, using the second formula, location information of a joint, corresponding to the correct joint, in the second skeleton posture based on the location information of the correct joint in the first skeleton posture, to reproduce, in the second skeleton posture, the location information of the correct joint in the first skeleton posture. In addition, the electronic device may further estimate location information of a joint, corresponding to an erroneous joint of the first skeleton posture, in the second skeleton posture based on a fourth skeleton posture obtained through fitting using the third skeleton posture. This can ensure that the location information of the erroneous joint in the first skeleton posture is not reproduced in the second skeleton posture obtained through fitting. Therefore, accuracy of recognizing a human body posture using the second skeleton posture is relatively high.

Optionally, after performing fitting based on location information of the correct joint to obtain the second skeleton posture, the method further includes recognizing a human body posture based on the second skeleton posture.

According to a second aspect, a skeleton posture determining apparatus is provided, where the apparatus includes at least one module, and the at least one module is configured to implement the skeleton posture determining method provided in any one of the first aspect or the optional manners of the first aspect.

According to a third aspect, a skeleton posture determining apparatus is provided, where the apparatus includes a processor and a memory, where the processor is configured to execute an instruction stored in the memory, and the processor executes the instruction to implement the skeleton posture determining method provided in any one of the first aspect or the optional manners of the first aspect.

According to a fourth aspect, a computer readable storage medium is provided, where the computer readable storage medium stores an instruction, and when the instruction is run on a processing component of a computer, the processing component is enabled to perform the skeleton posture determining method provided in any one of the first aspect or the optional manners of the first aspect.

According to a fifth aspect, a computer program product including an instruction is provided, where when the computer program product runs on a computer, the computer is enabled to perform the skeleton posture determining method in any one of the first aspect or the possible implementations of the first aspect.

The technical solutions provided in the embodiments of this application bring the following beneficial effects.

The first skeleton posture is obtained, where the first skeleton posture includes the location information of the plurality of joints, the location information of the correct joint is obtained from the first skeleton posture through screening, and the second skeleton posture is obtained by performing fitting using the location information of the correct joint. This can ensure that the second skeleton posture does not include location information of an erroneous joint. Therefore, accuracy of recognizing a human body posture using the second skeleton posture is relatively high.

DESCRIPTION OF EMBODIMENTS

To make the objectives, technical solutions, and advantages of this application clearer, the following further describes implementations of this application in detail with reference to the accompanying drawings.

In actual application, accurately recognizing a human body motion by an electronic device is a premise of successful interaction between the electronic device and a user. For example, for a service-oriented robot, after accurately recognizing a motion that a person is dining, the service-oriented robot can perform an action of clearing a dining table after the user finishes the dinner, or after accurately recognizing a motion that a person is taking pills, the service-oriented robot can perform an action of serving the user with a cup of water. For another example, after recognizing a motion that a person is waving upwards, a mobile terminal can perform a preset operation such as paging up. For another example, after recognizing a motion that a person is sitting on a sofa, a smart television (TV) can perform a preset operation such as automatic power-on. For another example, after recognizing a motion that a person goes to bed, a smart speaker can be powered off automatically. A human body motion usually includes a series of human body postures, therefore, accurately recognizing a human body posture plays an important role in recognizing the human body motion.

Figure 1:
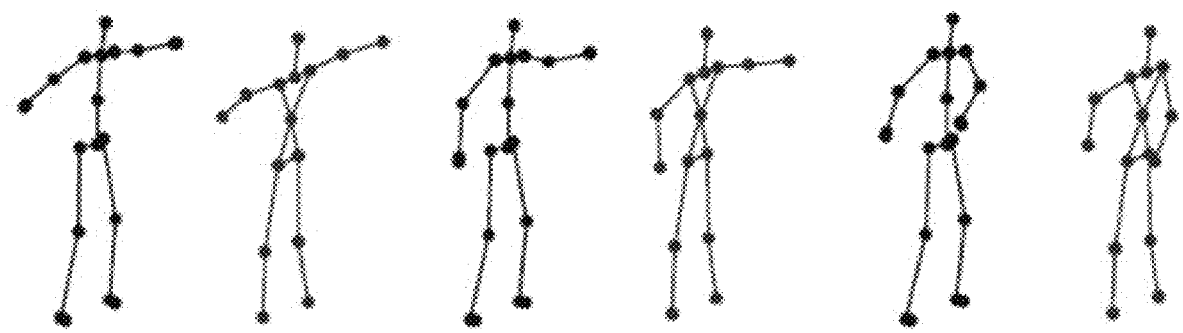
FIG. 1 shows six skeleton posture images corresponding to different human body postures.

In a related technology, a stereoscopic camera (for example, a binocular camera or a structured light camera) may be used to photograph a human body motion in order to obtain a motion video. The motion video may include a plurality of video frames, and each video frame may include a human body posture image. Then an electronic device may obtain a plurality of depth images that are in a one-to-one correspondence with the plurality of video frames. The depth image may also include a human body posture image. The depth image may be a grayscale image. In the grayscale image, a pixel value of a pixel may reflect a distance between the stereoscopic camera and a photographed physical object corresponding to the pixel. For each depth image, the electronic device may abstract a human body posture image of the depth image to obtain a skeleton posture of a human body. The skeleton posture may reflect a skeleton posture of the human body, and may include location information of a plurality of joints of the human body and location information of skeletons connecting these joints. FIG. 1 shows images of six skeleton postures corresponding to different human body postures. In FIG. 1, a node represents a joint, and a line connecting joints represents a skeleton. After obtaining a skeleton posture based on a depth image, the electronic device may recognize a human body posture image included in the depth image based on the skeleton posture, and then may recognize a human body motion based on a recognition result of a human body posture image of each depth image.

In actual application, the electronic device may abstract a human body posture image in a depth image in a plurality of manners to obtain a skeleton posture.

Figure 2:
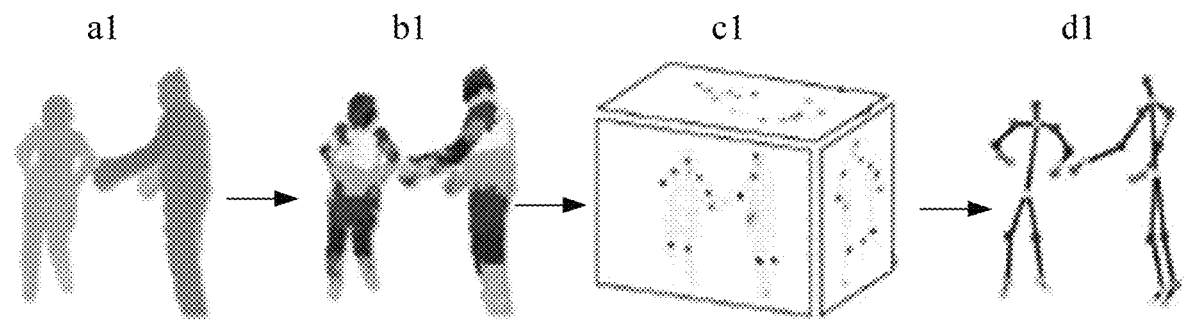
FIG. 2 is a schematic diagram of a technical process of abstracting a human body posture image in a depth image by an electronic device.

For example, as shown in FIG. 2, a technical process in which an electronic device abstracts a human body posture image in a depth image may be as follows. a1. The electronic device separates the human body posture image from the depth image. b1. The electronic device separates different regions (for example, the different regions may include a head region, a trunk region, a four-limb region, and the like) from the human body posture image using a random forest algorithm, where each region is a region in which a human joint may be located. c1. The electronic device projects the different regions onto three orthogonal planes xy, yz, and zx in a world coordinate system. d1. Locations of centers of projected different regions are extracted on each of the orthogonal planes using a mean shift algorithm, the locations of the centers are used as locations of joints, and then the electronic device may combine the locations of the joints on the three orthogonal planes to obtain location information of joints included in a skeleton posture.

Alternatively, a technical process in which an electronic device abstracts a human body posture image in a depth image may be as follows. The electronic device determines a central reference point of the human body posture image included in the depth image, the electronic device determines a preset geodesic distance between each joint of a human body and the central reference point, where the geodesic distance is a shortest distance between two points along a surface of an object, the electronic device determines location information of each joint of the human body using the geodesic distance between each joint of the human body and the central reference point, and the electronic device obtains a skeleton posture based on the location information of each joint of the human body.

In actual application, abstraction of the human body posture image may be interfered with by a plurality of factors, for example, by clothes worn by a user in the human body posture image or by a shelter. Due to interference by the plurality of factors, location information of a plurality of joints that is reflected by the skeleton posture obtained by abstracting the human body posture image may include location information of some erroneous joints, and a recognition error may be caused by recognizing a human body posture using such skeleton postures. As a result, human body posture recognition accuracy is affected.

Figure 3A:
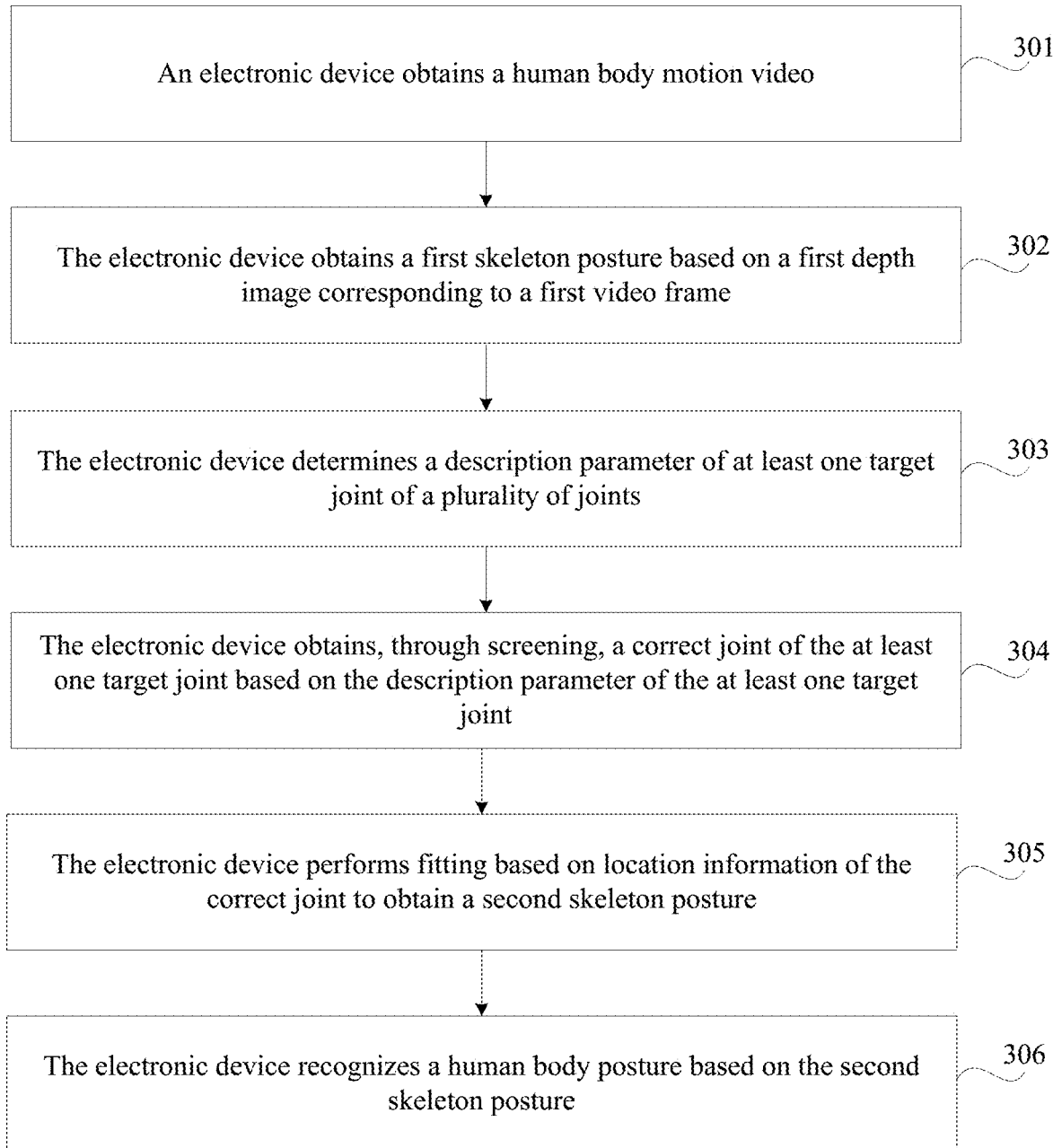
FIG. 3A is a flowchart of a skeleton posture determining method according to an embodiment of this application.

To improve human body posture recognition accuracy, an embodiment of this application provides a skeleton posture determining method. The skeleton posture determining method may be applied to an electronic device. The electronic device may be a robot, a mobile terminal, a smart TV, a smart speaker, or the like. As shown in FIG. 3A, the skeleton posture determining method may include the following steps.

Step 301. An electronic device obtains a human body motion video.

In actual application, a stereoscopic camera may be disposed in the electronic device, in this case, the electronic device may photograph a human body motion using the stereoscopic camera disposed in the electronic device, to obtain a human body motion video. Alternatively, the electronic device may be connected to another electronic device in which a stereoscopic camera is disposed, in this case, the electronic device may obtain a human body motion video obtained through photographing by the other electronic device.

It should be noted that the motion video may include a plurality of video frames, and each video frame may include a human body posture image.

Step 302. The electronic device obtains a first skeleton posture based on a first depth image corresponding to a first video frame.

It should be noted that the first video frame may be any video frame of the plurality of video frames included in the motion video. The electronic device may obtain the first depth image corresponding to the first video frame, where the first depth image includes a human body posture image. Then, the electronic device may abstract the human body posture image included in the first depth image, to obtain the first skeleton posture. A technical process of abstracting the human body posture image included in the first depth image by the electronic device is similar to that described above, and details are not described again in this embodiment of this application.

It should be further noted that the first skeleton posture may not be obtained based on the first depth image, but may be obtained in another manner. The first skeleton posture obtained in the other manner may correspond to the first depth image, that is, the first skeleton posture obtained in the other manner may reflect a human body posture in the first depth image.

The first skeleton posture obtained by the electronic device may correspond to a plurality of joints, and the first skeleton posture includes location information of the plurality of joints. As shown in a schematic diagram of joints in FIG. 3B, in an embodiment of this application, the first skeleton posture may correspond to the following plurality of joints: a head joint 3, a neck joint 2, a spine shoulder joint 20, a left shoulder joint 4, a right shoulder joint 8, a middle spine joint 1, a left elbow joint 5, a right elbow joint 9, a left wrist joint 6, a right wrist joint 10, a left hand joint 7, a right hand joint 11, a left thumb joint (English thumb left) 22, a right thumb joint 24, a left hand tip joint 21, a right hand tip joint 23, a left hip joint 12, a right hip joint 16, a left knee joint 13, a right knee joint 17, a left ankle joint 14, a right ankle joint 18, a left foot joint 15, a right foot joint 19, and a spine base joint 0.

Step 303. The electronic device determines a description parameter of at least one target joint of a plurality of joints.

As described above, the first skeleton posture may correspond to a plurality of joints, and the first skeleton posture includes location information of the plurality of joints. In a subsequent step, the electronic device may perform fitting based on the first skeleton posture to obtain a second skeleton posture, and recognize a human body posture image included in the first depth image using the second skeleton posture. The second skeleton posture may correspond to at least one joint, and the second skeleton posture includes location information of the at least one joint.

To perform fitting to obtain the second skeleton posture in the subsequent step, the electronic device may determine the at least one target joint from the plurality of joints corresponding to the first skeleton posture in step 303. The at least one target joint is in a one-to-one correspondence with the at least one joint corresponding to the second skeleton posture. Then the electronic device may determine the description parameter of the at least one target joint, to perform fitting using the description parameter to obtain the second skeleton posture in the subsequent step.

In actual application, a quantity of the at least one joint corresponding to the second skeleton posture may be less than or equal to a quantity of the plurality of joints corresponding to the first skeleton posture, and each of the at least one joint corresponding to the second skeleton posture corresponds to one of the plurality of joints corresponding to the first skeleton posture. When the quantity of the at least one joint corresponding to the second skeleton posture is less than the quantity of the plurality of joints corresponding to the first skeleton posture, the at least one target joint may be some of the plurality of joints corresponding to the first skeleton posture. When the quantity of the at least one joint corresponding to the second skeleton posture is equal to the quantity of the plurality of joints corresponding to the first skeleton posture, that is, the at least one joint corresponding to the second skeleton posture is in a one-to-one correspondence with the plurality of joints corresponding to the first skeleton posture, the at least one target joint may be all joints corresponding to the first skeleton posture.

Figure 3B:
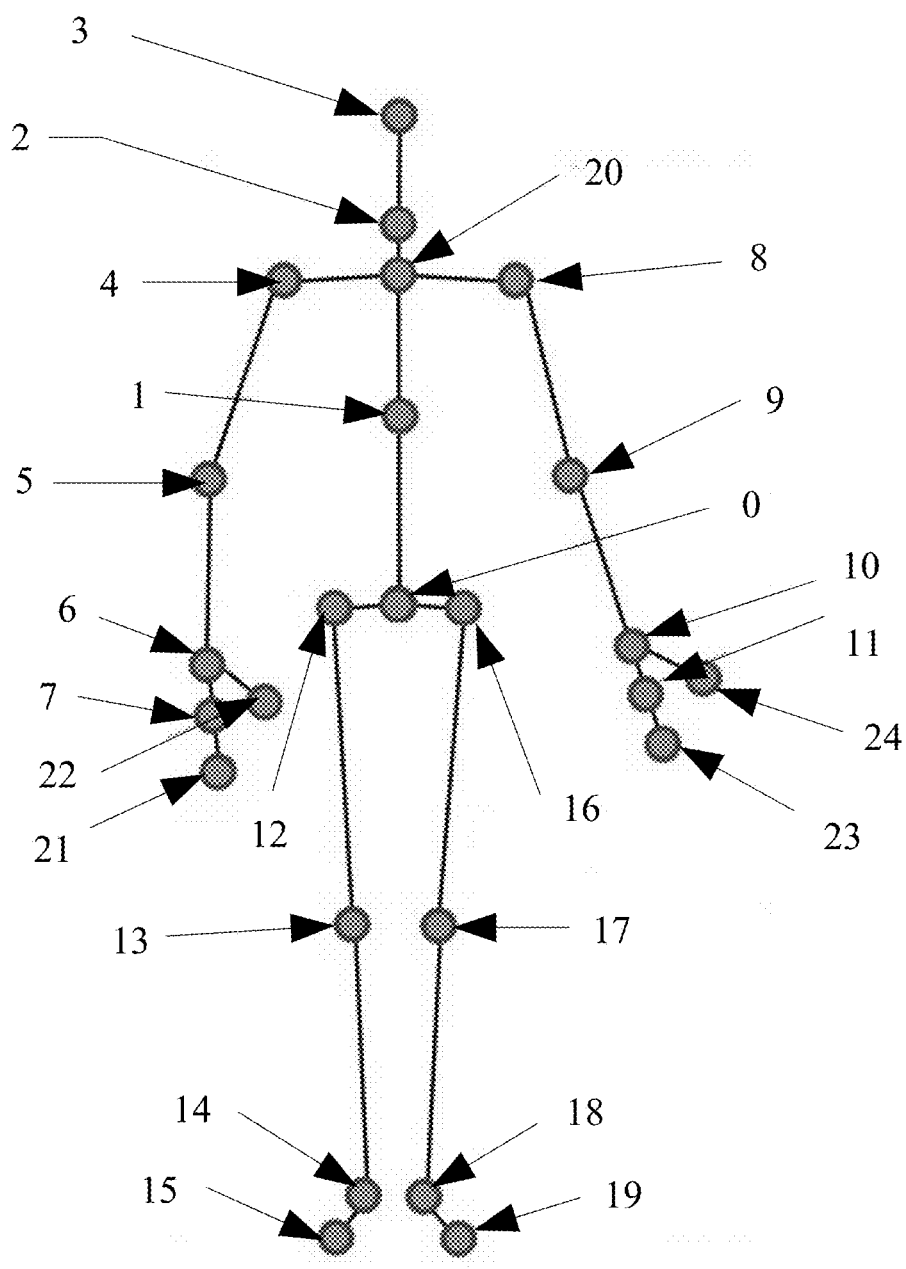
FIG. 3B is a schematic diagram of joints according to an embodiment of this application.
Figure 3C:
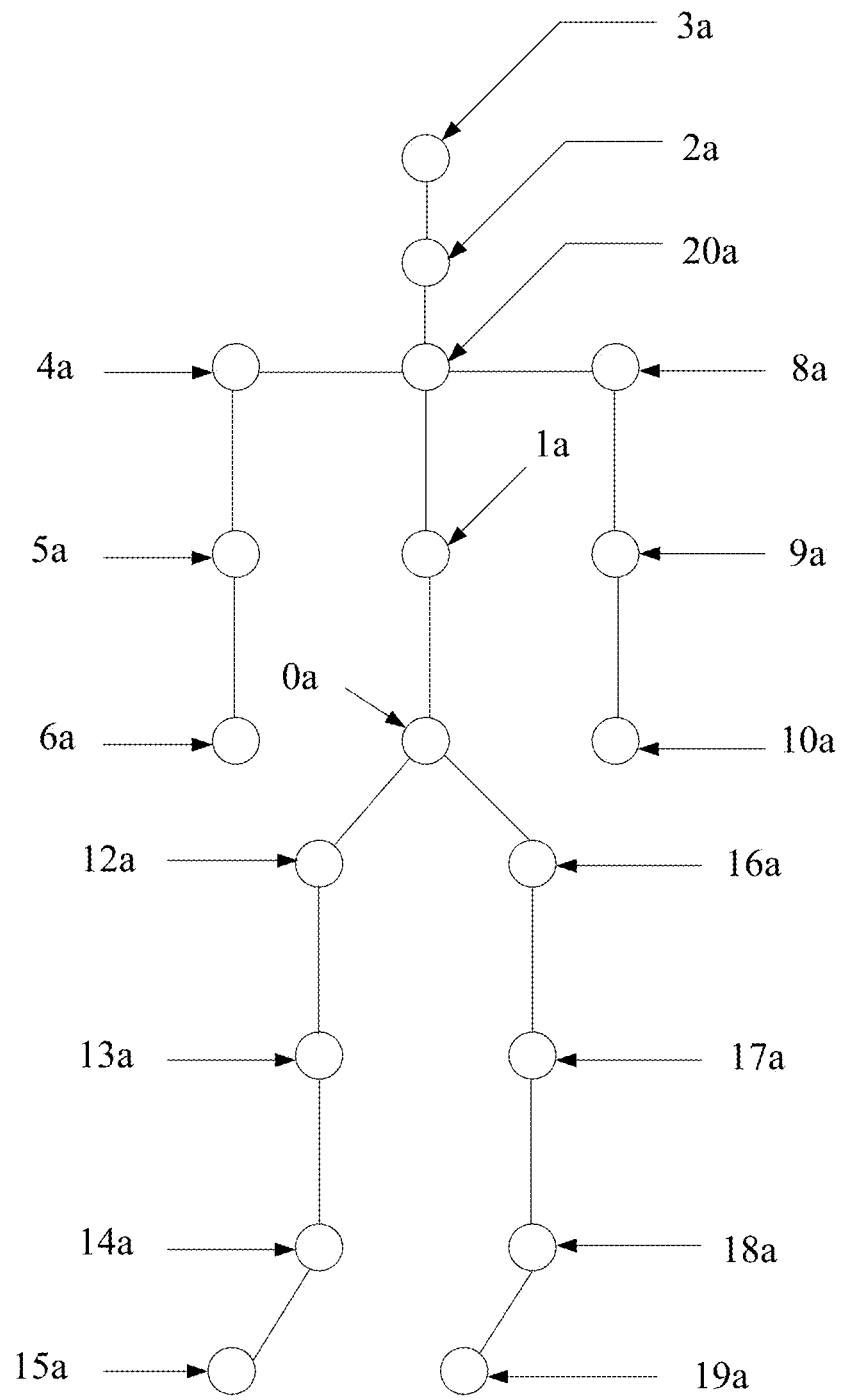
FIG. 3C is a schematic diagram of joints according to an embodiment of this application.

As shown in a schematic diagram of joints in FIG. 3C, in an embodiment of this application, the at least one joint corresponding to the second skeleton posture may be a head joint 3a, a neck joint 2a, a spine shoulder joint 20a, a left shoulder joint 4a, a right shoulder joint 8a, a middle spine joint 1a, a left elbow joint 5a, a right elbow joint 9a, a left wrist joint 6a, a right wrist joint 10a, a left hip joint 12a, a right hip joint 16a, a left knee joint 13a, a right knee joint 17a, a left ankle joint 14a, a right ankle joint 18a, a left foot joint 15a, a right foot joint 19a, and a spine base joint 0a. In this case, when the plurality of joints corresponding to the first skeleton posture are the plurality of joints shown in FIG. 3B, the at least one target joint may be joints 3, 2, 20, 4, 8, 1, 5, 9, 6, 10, 12, 16, 13, 17, 14, 18, 15, 19, and 0 shown in FIG. 3B. The joints 3, 2, 20, 4, 8, 1, 5, 9, 6, 10, 12, 16, 13, 17, 14, 18, 15, 19, and 0 shown in FIG. 3B correspond to the joints 3a, 2a, 20a, 4a, 8a, 1a, 5a, 9a, 6a, 10a, 12a, 16a, 13a, 17a, 14a, 18a, 15a, 19a, and 0a shown in FIG. 3C, respectively.

It should be noted that the description parameter may include location information of each of the at least one target joint. In addition, the description parameter may further include angular information of a target joint, having a child joint, of the at least one target joint. The child joint is a driven joint, that is, a joint that moves with a joint A. A child joint of the joint A is a driven joint of the joint A. For example, in the schematic diagram of the joints in FIG. 3B, a child joint of the left elbow joint 5 is the left wrist joint 6.

Location information of any target joint (referred to as a second joint below) of the at least one target joint may be represented using three-dimensional coordinates of the second joint in a world coordinate system.

Angular information of any target joint (referred to as a first joint below), having k (k is a positive integer greater than or equal to 1) child joints, of the at least one target joint may be represented by a rotation angle of a skeleton between the first joint and each of the k child joints relative to the first joint.

For example, as shown in the schematic diagram of the joints in FIG. 3B, the spine shoulder joint 20 has three child joints the neck joint 2, the left shoulder joint 4, and the right shoulder joint 8. In this case, angular information of the spine shoulder joint 20 may indicate a rotation angle of a skeleton between the spine shoulder joint 20 and the neck joint 2 relative to the spine shoulder joint 20, a rotation angle of a skeleton between the spine shoulder joint 20 and the left shoulder joint 4 relative to the spine shoulder joint 20, and a rotation angle of a skeleton between the spine shoulder joint 20 and the right shoulder joint 8 relative to the spine shoulder joint 20.

Optionally, a rotation angle of a skeleton a between the first joint and an $i^{th}$ child joint of the k child joints relative to the first joint may include a first Euler angle, a second Euler angle, and a third Euler angle, where $1 \leq i \leq k$.

The first Euler angle is an angle formed by rotating the skeleton a around an x-axis in a local coordinate system of the first joint, the second Euler angle is an angle formed by rotating the skeleton a around a y-axis in the local coordinate system of the first joint, and the third Euler angle is an angle formed by rotating the skeleton a around a z-axis in the local coordinate system of the first joint. Whether the first Euler angle, the second Euler angle, and the third Euler angle are positive or negative values may be determined according to a right hand rule. For example, for the first Euler angle, when the right hand is held, and the thumb of the right hand points to a forward direction of the x-axis in the local coordinate system, if a direction in which the skeleton a rotates around the x-axis is consistent with a direction of the other four fingers of the right hand, the first Euler angle is a positive value, or if a direction in which the skeleton a rotates around the x-axis is inconsistent with a direction of the other four fingers of the right hand, the first Euler angle is a negative value. Whether the second Euler angle and the third Euler angle are positive or negative values is determined in a similar way as the first Euler angle, and details are not described again in this embodiment of this application.

Using Euler angles to represent a rotation angle of a skeleton relative to a joint enables viewpoint invariance for the rotation angle, to be specific, the rotation angle does not vary with a location change of a stereoscopic camera.

An origin of the local coordinate system of the first joint is a central point of the first joint. When the first joint has a second-level parent joint, a direction of the y-axis is a direction from the first joint to a parent joint of the first joint, a direction of the z-axis is a direction of a cross product of a unit direction vector of the y-axis and a unit direction vector of a vector directed from the parent joint of the first joint to the second-level parent joint of the first joint, and a direction of the x-axis is a direction of a cross product of the unit direction vector of the y-axis and a unit direction vector of the z-axis. When the first joint does not have a second-level parent joint, but has a parent joint, a direction of the y-axis is a direction from the first joint to the parent joint of the first joint, the z-axis is parallel to a spine, and points to the head joint, and a direction of the x-axis is a direction of a cross product of a unit direction vector of the y-axis and a unit direction vector of the z-axis.

The parent joint is a concept relative to the child joint, and is a driving joint. A parent joint of the joint A is a driving joint of the joint A, that is, the joint A moves with the parent joint of the joint A. For example, in the schematic diagram of the joints shown in FIG. 3B, a child joint of the left elbow joint 5 is the left wrist joint 6, and a parent joint of the left wrist joint 6 is the left elbow joint 5. The second-level parent joint is a parent joint of a parent joint. For example, if a parent joint of the joint A is a joint B, and a parent joint of the joint B is a joint C, the joint C is a second-level parent joint of the joint A. In addition, the first skeleton posture may include location information of the spine. The location information of the spine is used to indicate a direction of the spine. For example, as shown in the schematic diagram of the joints in FIG. 3B, a skeleton between the middle spine joint 1 and the spine base joint 0 is the spine. In this case, the location information of the spine included in the first skeleton posture may be used to indicate a direction of the skeleton between the middle spine joint 1 and the spine base joint 0.

For example, as shown in the schematic diagram of the joints in FIG. 3B, when the first joint is the left elbow joint 5, because the left elbow joint 5 has a parent joint, namely the left shoulder joint 4, and has a second-level parent joint, namely the neck joint 2, a direction of a y-axis in a local coordinate system of the left elbow joint 5 is a direction from the left elbow joint 5 to the left shoulder joint 4, a direction of a z-axis in the local coordinate system of the left elbow joint 5 is a direction of a cross product of a unit direction vector of the y-axis and a unit direction vector of a vector directed from the left shoulder joint 4 to the neck joint 2, and a direction of an x-axis in the local coordinate system of the left elbow joint 5 is a direction of a cross product of the unit direction vector of the y-axis and a unit direction vector of the z-axis.

For another example, as shown in the schematic diagram of the joints in FIG. 3B, when the first joint is the right hip joint 16, because the right hip joint 16 has only a parent joint, namely the spine base joint 0, but does not have a second-level parent joint, a direction of a y-axis in a local coordinate system of the right hip joint 16 is a direction from the right hip joint 16 to the spine base joint 0, a direction of a z-axis in the local coordinate system of the right hip joint 16 is parallel to a skeleton between the middle spine joint 1 and the spine base joint 0, and points to the head joint 3, and a direction of an x-axis in the local coordinate system of the right hip joint 16 is a direction of a cross product of a unit direction vector of the y-axis and a unit direction vector of the z-axis.

It should be noted that as shown in the schematic diagram of the joints in FIG. 3B, the middle spine joint 1 has a parent joint, namely the spine base joint 0, but does not have a second-level parent joint, therefore, based on the definitions of the x-axis, y-axis, and z-axis in the local coordinate system, a direction of a y-axis in a local coordinate system of the middle spine joint 1 is a direction from the middle spine joint 1 to the spine base joint 0, and a direction of a z-axis in the local coordinate system of the middle spine joint 1 is parallel to a skeleton between the middle spine joint 1 to the spine base joint 0. That is, based on the definitions of the x-axis, y-axis, and z-axis in the local coordinate system, the direction of the y-axis in the local coordinate system of the middle spine joint 1 is parallel to the direction of the z-axis. This causes an incorrect definition of the local coordinate system of the middle spine joint 1. To avoid this error, during definition of the local coordinate system of the middle spine joint 1, the middle spine joint 1 may be considered as a joint having a second-level parent joint, and the right hip joint 16 may be considered as a pseudo second-level parent joint of the middle spine joint 1.

It should also be noted that as shown in the schematic diagram of the joints in FIG. 3B, the spine base joint 0 is a root joint in the first skeleton posture. The root joint is a root that does not have a parent joint. Because the spine base joint 0 does not have a parent joint, based on the definitions of the x-axis, y-axis, and z-axis in the local coordinate system, the spine base joint 0 does not have a local coordinate system. In addition, based on knowledge of human physiology, it can be learned that none of child joints of the spine base joint 0, that is, the left hip joint 12, the right hip joint 16, and the middle spine joint 1, can rotate relative to the spine base joint 0, therefore, the spine base joint 0 has no angular information.

Calculation of the first Euler angle, the second Euler angle, and the third Euler angle is usually relatively complex, and it is usually difficult to obtain a unique solution. Therefore, in this embodiment of this application, the electronic device may use a projected angle of the first Euler angle, a projected angle of the second Euler angle, and a projected angle of the third Euler angle to represent the first Euler angle, the second Euler angle, and the third Euler angle, respectively. The projected angle of the first Euler angle is an angle formed by projecting the skeleton a between a first projected skeleton on a plane yz in a local coordinate system and a y-axis in the local coordinate system, the projected angle of the second Euler angle is an angle formed by projecting the skeleton a between a second projected skeleton on a plane xz in the local coordinate system and a z-axis in the local coordinate system, and the projected angle of the third Euler angle is an angle formed by projecting the skeleton a between a third projected skeleton on a plane xy in the local coordinate system and an x-axis in the local coordinate system. The projected angle of the first Euler angle, the projected angle of the second Euler angle, and the projected angle of the third Euler angle may be calculated based on a first formula group, and the first formula group is:

$$\begin{cases} \alpha_{ijk} = \text{sign}(\alpha) \times \cos^{-1}\left(\frac{\vec{n_y} \cdot \overrightarrow{prj_x}(J_jJ_i)}{\|\overrightarrow{prj_x}(J_jJ_i)\|}\right) \\ \beta_{ijk} = \text{sign}(\beta) \times \cos^{-1}\left(\frac{\vec{n_z} \cdot \overrightarrow{prj_y}(J_jJ_i)}{\|\overrightarrow{prj_y}(J_jJ_i)\|}\right), \\ \gamma_{ijk} = \text{sign}(\gamma) \times \cos^{-1}\left(\frac{\vec{n_x} \cdot \overrightarrow{prj_z}(J_jJ_i)}{\|\overrightarrow{prj_z}(J_jJ_i)\|}\right) \end{cases}$$

$$\text{sign}(\alpha) = \begin{cases} 1, & \frac{\vec{n_y} \times \overrightarrow{prj_x}(J_jJ_i)}{\|\vec{n_y} \times \overrightarrow{prj_x}(J_jJ_i)\|} = \vec{n_x} \\ -1, & \frac{\vec{n_y} \times \overrightarrow{prj_x}(J_jJ_i)}{\|\vec{n_y} \times \overrightarrow{prj_x}(J_jJ_i)\|} = -\vec{n_x} \end{cases},$$

$$\text{sign}(\beta) = \begin{cases} 1, & \frac{\vec{n_z} \times \overrightarrow{prj_y}(J_jJ_i)}{\|\vec{n_z} \times \overrightarrow{prj_y}(J_jJ_i)\|} = \vec{n_y} \\ -1, & \frac{\vec{n_z} \times \overrightarrow{prj_y}(J_jJ_i)}{\|\vec{n_z} \times \overrightarrow{prj_y}(J_jJ_i)\|} = -\vec{n_y} \end{cases}, \text{ and}$$

$$\text{sign}(\gamma) = \begin{cases} 1, & \frac{\vec{n_x} \times \overrightarrow{prj_z}(J_jJ_i)}{\|\vec{n_x} \times \overrightarrow{prj_z}(J_jJ_i)\|} = \vec{n_z} \\ -1, & \frac{\vec{n_x} \times \overrightarrow{prj_z}(J_jJ_i)}{\|\vec{n_x} \times \overrightarrow{prj_z}(J_jJ_i)\|} = -\vec{n_z} \end{cases},$$

$\alpha_{ijk}$ is the projected angle of the first Euler angle, $\beta_{ijk}$ is the projected angle of the second Euler angle, $\gamma_{ijk}$ is the projected angle of the third Euler angle, $\vec{n}_x$ is a unit direction vector of the x-axis in the local coordinate system of the first joint, $\vec{n}_y$ is a unit direction vector of the y-axis in the local coordinate system of the first joint, $\vec{n}_z$ is a unit direction vector of the z-axis in the local coordinate system of the first joint, $\overrightarrow{prj_x}(\vec{J_jJ_i})$ is a projected vector of projecting a target vector to a plane yz in the local coordinate system of the first joint, $\overrightarrow{prj_y}(\vec{J_jJ_i})$ is a projected vector of projecting the target vector to a plane xz in the local coordinate system of the first joint, $\overrightarrow{prj_z}(\vec{J_jJ_i})$ is a projected vector of projecting the target vector to a plane xy in the local coordinate system of the first joint, where the target vector is a vector directed from the first joint to the $i^{th}$ child joint of the k child joints of the first joint, that is, a direction of the target vector is a direction from the first joint to the $i^{th}$ child joint, and a modulus (length) of the target vector is equal to a length of the skeleton a between the first joint and the $i^{th}$ child joint.

$$\text{sign}(\alpha) = \begin{cases} 1, & \frac{\vec{n_y} \times \overrightarrow{prj_x}(J_jJ_i)}{\|\vec{n_y} \times \overrightarrow{prj_x}(J_jJ_i)\|} = \vec{n_x} \\ -1, & \frac{\vec{n_y} \times \overrightarrow{prj_x}(J_jJ_i)}{\|\vec{n_y} \times \overrightarrow{prj_x}(J_jJ_i)\|} = -\vec{n_x} \end{cases}$$

indicates that $\text{sign}(\alpha)$ is equal to 1 when $$\frac{\vec{n_y} \times \overrightarrow{prj_x}(J_jJ_i)}{\|\vec{n_y} \times \overrightarrow{prj_x}(J_jJ_i)\|} = \vec{n_x},$$

and that $\text{sign}(\alpha)$ is equal to −1 when $$\frac{\vec{n_y} \times \overrightarrow{prj_x}(J_jJ_i)}{\|\vec{n_y} \times \overrightarrow{prj_x}(J_jJ_i)\|} = -\vec{n_x},$$

where $\| \|$ is a vector modulus operator, and $\times$ is a vector cross-product operator. $\text{sign}(\beta)$ and $\text{sign}(\gamma)$ are similar to $\text{sign}(\alpha)$.

Step 304. The electronic device obtains, through screening, a correct joint of the at least one target joint based on the description parameter of the at least one target joint.

In this embodiment of this application, the electronic device may remove an erroneous joint from the at least one target joint based on the description parameter of the at least one target joint in one or at least two of the following four manners, and then the electronic device may determine an unremoved target joint in the at least one target joint as the correct joint.

In a first manner, the electronic device determines whether an angle indicated by angular information of the first joint falls within a preset angle range, and when the angle indicated by the angular information of the first joint is beyond the preset angle range, the electronic device may determine that the first joint is an erroneous joint, and then remove the first joint from the at least one target joint.

Based on knowledge of human physiology, it can be learned that human joints can usually move only in a specific motion range, therefore, if the angle indicated by the angular information of the first joint is beyond the preset angle range, the electronic device may determine that the first joint is an erroneous joint, and remove the first joint from the at least one target joint as an erroneous joint.

As described above, the angular information of the first joint may indicate the rotation angle of the skeleton between the first joint and each of the k child joints relative to the first joint, that is, the angular information of the first joint may indicate k rotation angles.

When k is equal to 1, that is, when the first joint has only one child joint, the angular information of the first joint may indicate one rotation angle. The electronic device may determine whether the rotation angle falls within the preset angle range, and when the rotation angle is beyond the preset angle range, the electronic device may determine that the first joint is an erroneous joint, and remove the first joint from the at least one target joint.

Optionally, as described above, the rotation angle may include the first Euler angle, the second Euler angle, and the third Euler angle, in this case, the preset angle range may include a first Euler angle range, a second Euler angle range, and a third Euler angle range. When the first Euler angle is beyond the first Euler angle range, the second Euler angle is beyond the second Euler angle range, or the third Euler angle is beyond the third Euler angle range, the electronic device may determine that the rotation angle is beyond the preset angle range.

When k is greater than 1, that is, when the first joint has at least two child joints, the angular information of the first joint may indicate at least two rotation angles. In this case, the preset angle range may include at least two angle sub-ranges. The at least two angle sub-ranges are in a one-to-one correspondence with the at least two rotation angles. When any one of the at least two rotation angles is beyond an angle sub-range corresponding to the rotation angle, the electronic device may determine that the first joint is an erroneous joint, and remove the first joint from the at least one target joint.

Similarly, each angle sub-range may include a first Euler angle range, a second Euler angle range, and a third Euler angle range. When a first Euler angle included in any one rotation angle (referred to as a target rotation angle below) of the at least two rotation angles is beyond a first Euler angle range included in an angle sub-range (referred to as a target angle sub-range below) corresponding to the rotation angle, a second Euler angle included in the target rotation angle is beyond a second Euler angle range included in the target angle sub-range, or a third Euler angle included in the target rotation angle is beyond a third Euler angle range included in the target angle sub-range, the electronic device may determine that the target rotation angle is beyond the target angle sub-range.

It should be noted that, as described above, to simplify calculation, the first Euler angle, the second Euler angle, and the third Euler angle may be represented by a projected angle of the first Euler angle, a projected angle of the second Euler angle, and a projected angle of the third Euler angle. In this case, the first Euler angle range, the second Euler angle range, and the third Euler angle range may be a projected angle range of the first Euler angle, a projected angle range of the second Euler angle, and a projected angle range of the third Euler angle, respectively.

For example, as shown in the schematic diagram of the joints in FIG. 3B, angular information of the spine shoulder joint 20 may indicate a rotation angle (referred to as a first rotation angle below) of a skeleton between the spine shoulder joint 20 and the neck joint 2 relative to the spine shoulder joint 20, a rotation angle (referred to as a second rotation angle below) of a skeleton between the spine shoulder joint 20 and the left shoulder joint 4 relative to the spine shoulder joint 20, and a rotation angle (referred to as a third rotation angle below) of a skeleton between the spine shoulder joint 20 and the right shoulder joint 8 relative to the spine shoulder joint 20, and the preset angle range may include a first angle sub-range (corresponding to the first rotation angle), a second angle sub-range (corresponding to the second rotation angle), and a third angle sub-range (corresponding to the third rotation angle).

In this case, a technical process in which the electronic device determines whether an angle indicated by the angular information of the spine shoulder joint 20 falls within the preset angle range may be as follows. The electronic device determines whether the first rotation angle falls within the first angle sub-range, whether the second rotation angle falls within the second angle sub-range, and whether the third rotation angle falls within the third angle sub-range, and when the first rotation angle is beyond the first angle sub-range, the second rotation angle is beyond the second angle sub-range, or the third rotation angle is beyond the third angle sub-range, the electronic device determines that the angle indicated by the angular information of the spine shoulder joint 20 is beyond the preset angle range.

The first angle sub-range includes a first Euler angle range, a second Euler angle range, and a third Euler angle range, and the first rotation angle includes a first Euler angle, a second Euler angle, and a third Euler angle. In this case, a technical process in which the electronic device determines whether the first rotation angle falls within the first angle sub-range may be as follows. The electronic device determines whether the first Euler angle falls within the first Euler angle range, whether the second Euler angle falls within the second Euler angle range, and whether the third Euler angle falls within the third Euler angle range, and when the first Euler angle is beyond the first Euler angle range, the second Euler angle is beyond the second Euler angle range, or the third Euler angle is beyond the third Euler angle range, the electronic device determines that the first rotation angle is beyond the first angle sub-range.

Technical processes in which the electronic device determines whether the second rotation angle falls within the second angle sub-range and the electronic device determines whether the third rotation angle falls within the third angle sub-range are similar to the technical process in which the electronic device determines whether the first rotation angle falls within the first angle sub-range, and details are not described again in this embodiment of this application.

TABLE 1

| | Preset angle range of a parent joint | | |
|---|---|---|---|
| Joint number | First Euler angle range (°) | Second Euler angle range (°) | Third Euler angle range (°) |
| 20 | [−180, −120] U [150, 180] | [−180, 180] | [−120, −60] |
| 2 | [−180, −135] U [135, 180] | [−180, 180] | [−135, −45] |
| 3 | [−60, 60] | [−180, 180] | [−120, −30] |
| 4 | [−180, 180] | [−100, −80] | [−180, −170] U [170, 180] |
| 8 | [−180, 180] | [80, 100] | [−10, 10] |
| 5 | [−180, −130] U [45, 180] | [−80, 130] | [−180, 40] |
| 9 | [−180, −45] U [130, 180] | [−180, −100] U [50, 180] | [−180, 40] |
| 6 | [−180, −170] U [30, 180] | [−60, 70] | [−180, 180] |
| 10 | [−180, −30] U [170, 180] | [−180, −120] U [110, 180] | [−180, 180] |
| 7 | [−180, −30] U [170, 180] | [−130, −90] U [90, 130] | [−150, 0] |
| 11 | [−180, −50] U [140, 180] | [−90, −50] U [50, 90] | [−150, 0] |
| 21 | [−180, −170] U [170, 180] | [−90] U [90] | [−120, 10] |
| 23 | [−180, −170] U [170, 180] | [−90] U [90] | [−120, 10] |
| 22 | [−180, −90] U [90, 180] | [−130, −50] U [50, 130] | [−100, 0] |
| 24 | [−180, −90] U [90, 180] | [−130, −50] U [50, 130] | [−100, 0] |
| 13 | [−135, −60] | [−180, −165] U [60, 180] | [−45, 30] |
| 17 | [−135, −60] | [−180, −60] U [165, 180] | [−180, −135] U [150, 180] |
| 14 | [−180, −30] U [170, 180] | [−180, −130] U [140, 180] | [−180, 180] |
| 18 | [−180, −170] U [30, 180] | [−50, 40] | [−180, 180] |
| 15 | [−180, −150] U [145, 180] | [−125, −60] | [−45, 50] |
| 19 | [−180, −145] U [150, 180] | [−120, −55] | [−45, 50] |

It should be noted that each first joint may correspond to one preset angle range. The preset angle range may be obtained based on human physiology data. For example, the preset angle range may be obtained based on a motion range of each joint in a human body orthotopic method recommended by the American Surgical Association. Table 1 shows a preset angle range corresponding to a parent joint of each joint shown in FIG. 3B.

It should be noted that, in the preset angle range shown in Table 1, the first Euler angle range is the projected angle range of the first Euler angle, the second Euler angle range is the projected angle range of the second Euler angle, and the third Euler angle range is the projected angle range of the third Euler angle. In addition, the preset angle range shown in Table 1 is merely an example, and is not intended to limit the protection scope of this application.

In a second manner, the electronic device determines a length of a skeleton between a third joint and a parent joint of the third joint based on location information of the third joint and location information of the parent joint of the third joint, where the third joint is any target joint, having a parent joint, of the at least one target joint, when the length of the skeleton between the third joint and the parent joint of the third joint is beyond a pre-obtained skeleton length range, the electronic device determines that the third joint is an erroneous joint, and then the electronic device may remove the erroneous joint from the at least one target joint.

Based on knowledge of human physiology, it can be learned that a length of a human skeleton usually falls within a specific length range, that is, the length of the human skeleton cannot be excessively long or short. In addition, the length of the human skeleton cannot change within a short period, either. Therefore, if the length of the skeleton between the third joint and the parent joint of the third joint is beyond the pre-obtained skeleton length range, the electronic device may determine that the third joint is an erroneous joint, and remove the third joint from the at least one target joint as an erroneous joint.

It should be noted that before the erroneous joint is removed in the second manner, the electronic device may obtain a skeleton length range corresponding to each skeleton. An embodiment of this application provides the following three manners of obtaining a skeleton length range.

In a first obtaining manner, after obtaining a human body motion video, the electronic device recognizes a human face image included in the motion video, to obtain a user identity corresponding to the human face image, and then the electronic device obtains, from a database of a prestored skeleton length range, a skeleton length range set corresponding to the user identity. The skeleton length range set includes a skeleton length range corresponding to each skeleton.

In a second obtaining manner, after obtaining a human body motion video, the electronic device obtains a body height based on the motion video, and then the electronic device obtains, from a database of a prestored skeleton length range, a skeleton length range set corresponding to the body height. The skeleton length range set includes a skeleton length range corresponding to each skeleton.

In a third obtaining manner, after obtaining a human body motion video, the electronic device obtains a to-be-tested skeleton posture based on a depth image corresponding to a video frame of first several video frames (for example, first one or first 10 video frames) of the motion video, and the electronic device obtains, based on location information of a joint included in the to-be-tested skeleton posture, a skeleton length corresponding to each skeleton. Then, for each skeleton, the electronic device multiplies a skeleton length corresponding to the skeleton by a first preset value, to obtain a lower skeleton length range limit corresponding to the skeleton, and multiplies the skeleton length corresponding to the skeleton by a second preset value, to obtain an upper skeleton length range limit corresponding to the skeleton. The first preset value is less than 1. For example, the first preset value may be 0.9. The second preset value is greater than 1. For example, the second preset value may be 1.1.

It should be noted that, in actual implementation, other manners may be used to obtain the skeleton length range, and are not described one by one in this embodiment of this application.

In a third manner, when a pixel value of a human body posture image in a first depth image is different from a pixel value of a non-human-body posture image (for example, the pixel value of the human body posture image is not 0, and the pixel value of the non-human-body posture image is 0), the electronic device may determine two-dimensional coordinates of a second joint in an image coordinate system of the first depth image based on location information of the second joint, the electronic device determines, in the first depth image, a pixel value sum of at least one pixel in a preset range around the two-dimensional coordinates, and when the pixel value sum is beyond a preset pixel-value-sum range, the electronic device determines that the second joint is an erroneous joint, and removes the erroneous joint from the at least one target joint.

Based on knowledge of human physiology, it can be learned that a human joint cannot be located outside a human body. Therefore, when the second joint is located outside the human body, the electronic device may determine that the second joint is an erroneous joint, and remove the second joint from the at least one target joint as an erroneous joint.

The electronic device may determine, using the following technical process, whether the second joint is located outside the human body.

a2. The electronic device determines two-dimensional coordinates of the second joint in an image coordinate system of the first depth image based on location information of the second joint.

As described above, the location information of the second joint is used to indicate three-dimensional coordinates of the second joint in a world coordinate system. In step a2, the electronic device may obtain the two-dimensional coordinates of the second joint in the image coordinate system of the first depth image based on the three-dimensional coordinates of the second joint in the world coordinate system.

b2. The electronic device determines, in the first depth image, at least one pixel within a preset range around the two-dimensional coordinates.

It should be noted that the preset range may be set by a technician based on a resolution of the first depth image. For example, the preset range may be a range of a square with a side length of 5 around the two-dimensional coordinates, or the like.

c2. The electronic device obtains a pixel value sum of the at least one pixel.

d2. The electronic device determines whether the pixel value sum is beyond a preset pixel-value-sum range.

The pixel-value-sum range may be preset by a technician. The pixel-value-sum range is a range between a minimum value and a maximum value of pixel value sums within a preset range when all pixels in the preset range are located within a human body posture image.

e2. When the pixel value sum is beyond the preset pixel-value-sum range, the electronic device determines that the second joint is located outside the human body.

For example, when the pixel value of the non-human-body posture image in the first depth image is 0, but the pixel value of the human body posture image is not 0, if a pixel value sum is 0, and a preset pixel-value-sum range is $(-\infty, 0) \cup (0, +\infty)$, the pixel value sum is beyond the preset pixel-value-sum range. In this case, the electronic device may determine that the second joint is located outside the human body.

In a fourth manner, when the first video frame is a $t^{th}$ (t is a positive integer greater than 1) video frame of a plurality of video frames included in the motion video, the electronic device may obtain a third skeleton posture. The third skeleton posture is obtained based on a second depth image corresponding to a $(t-1)^{th}$ video frame of the plurality of video frames included in the motion video. The third skeleton posture includes location information of a plurality of preset joints. The plurality of preset joints are in a one-to-one correspondence with the plurality of joints corresponding to the first skeleton posture. Then the electronic device obtains, from the third skeleton posture, location information of a fourth joint corresponding to the second joint, obtains a distance between location coordinates indicated by the location information of the fourth joint and location coordinates indicated by location information of the second joint, and when the distance between the location coordinates indicated by the location information of the fourth joint and the location coordinates indicated by the location information of the second joint is greater than a preset distance threshold, determines that the second joint is an erroneous joint, and removes the erroneous joint from the at least one target joint.

Based on knowledge of human physiology, it can be learned that a motion speed of a human joint shall fall within a specific speed range. The motion speed of the human joint cannot be excessively high. Therefore, when a motion speed of the second joint is excessively high and is beyond a specific speed range, the electronic device may determine that the second joint is an erroneous joint, and remove the second joint from the at least one target joint as an erroneous joint.

The electronic device may determine, based on a location change of the second joint in two consecutive video frames, whether the motion speed of the second joint is beyond a specific speed range. Optionally, a technical process of the determining may be as follows.

a3. The electronic device obtains a second depth image corresponding to a $(t-1)^{th}$ video frame included in the motion video, and abstracts a human body posture image included in the second depth image to obtain a third skeleton posture. The third skeleton posture corresponds to a plurality of preset joints, the third skeleton posture includes location information of the plurality of preset joints, and the plurality of preset joints are in a one-to-one correspondence with the plurality of joints corresponding to the first skeleton posture.

For example, the plurality of joints corresponding to the first skeleton posture may be the plurality of joints shown in the schematic diagram of the joints in FIG. 3B, and the plurality of preset joints corresponding to the third skeleton posture may also be the plurality of joints shown in the schematic diagram of the joints in FIG. 3B.

b3. The electronic device determines a fourth joint from the plurality of preset joints, where the fourth joint is a joint corresponding to the second joint.

c3. The electronic device obtains location information of the fourth joint from the third skeleton posture.

d3. The electronic device obtains a distance between location coordinates (three-dimensional coordinates in the world coordinate system) indicated by the location information of the fourth joint and location coordinates (three-dimensional coordinates in the world coordinate system) indicated by the location information of the second joint.

e3. When the distance is greater than a preset distance threshold, the electronic device determines that a motion speed of the second joint is beyond a specific speed range.

The distance threshold may be calculated according to the following formula:

$$s_{lim} = v_{max} \times \Delta f \times \lambda,$$

where $s_{lim}$ is the distance threshold, $v_{max}$ is a maximum motion speed of the human joint, $\Delta f$ is a frame interval of the motion video, that is, a time interval between two consecutive video frames of the motion video, and $\lambda$ is a control factor and is related to an age of a user. Usually, when the user is an aged user, a value of $\lambda$ is relatively small, or when the user is a young user, a value of $\lambda$ is relatively large.

In an embodiment of this application, when a frame rate of the motion video is 30 frames per second, a maximum value of the distance threshold may be set to 0.2 meters (m), and is usually less than 0.05 m.

It should be noted that, in actual application, other manners may be used to remove an erroneous joint from the at least one target joint, and are not described one by one in this embodiment of this application.

Step 305. The electronic device performs fitting based on location information of the correct joint to obtain a second skeleton posture.

After obtaining, through screening, the correct joint from the at least one target joint, the electronic device may perform fitting based on the location information of the correct joint to obtain the second skeleton posture. Optionally, the fitting process may be as follows.

a4. The electronic device obtains location information of a first preset joint from the first skeleton posture.

In actual application, the first preset joint may be a root joint. For example, the first preset joint may be the spine base joint 0 shown in the schematic diagram of the joints in FIG. 3B. Certainly, the first preset joint may alternatively be another joint in the spine. For example, the first preset joint may alternatively be the middle spine joint 1 or the spine shoulder joint 20 shown in the schematic diagram of the joints in FIG. 3B. In an embodiment of this application, the first preset joint may alternatively be the head joint.

It should be noted that the first preset joint is a target joint of the at least one target joint.

b4. The electronic device determines the location information of the first preset joint as location information of a second preset joint in the second skeleton posture.

It should be noted that the second preset joint corresponds to the first preset joint. When the first preset joint is a root joint, the second preset joint is also a root joint. For example, when the first preset joint is the spine base joint 0 shown in FIG. 3B, the second preset joint may be the spine base joint 0$a$ shown in FIG. 3C.

c4. The electronic device obtains an orientation of a front side of a human body trunk in a human body posture corresponding to the first skeleton posture in the world coordinate system.

The front side of the human body trunk is a side that includes the navel in the human body trunk. This embodiment of this application provides the following two manners of determining the orientation (first front orientation for short below) of the front side of the human body trunk in the human body posture corresponding to the first skeleton posture in the world coordinate system.

In a first determining manner, the electronic device determines an orientation of a tiptoe in the human body posture corresponding to the first skeleton posture in the world coordinate system, and determines the orientation of the tiptoe in the world coordinate system as the first front orientation.

Optionally, the electronic device may obtain a 3D point cloud in a human foot image of a first depth image, and then may project the 3D point cloud onto a plane xy in the world coordinate system, where the plane xy is parallel to a plane on which the ground in the first depth image is located. The electronic device may obtain a main feature vector of the projected 3D point cloud, and determine a direction of the main feature vector as the first front orientation.

In a second determining manner, the electronic device determines an orientation of a human face in the human body posture corresponding to the first skeleton posture in the world coordinate system, and then determines the orientation of the human face in the world coordinate system as the first front orientation.

Optionally, the electronic device may obtain a human head image in the first depth image, and then determine, based on the head image, the orientation of the human face in the human body posture corresponding to the first skeleton posture in the world coordinate system.

d4. Determine the first front orientation as a front orientation indicated by human body orientation information in the second skeleton posture, where the human body orientation information is used to indicate an orientation of the front side of the human body trunk in a human body posture corresponding to the second skeleton posture in the world coordinate system.

In an embodiment of this application, the second skeleton posture may include human body orientation information, where the human body orientation information may include location information of a spine and location information of two hip joints, and the front orientation indicated by the human body orientation information is a direction in which the two hip joints protrude relative to the spine.

Figure 3D:
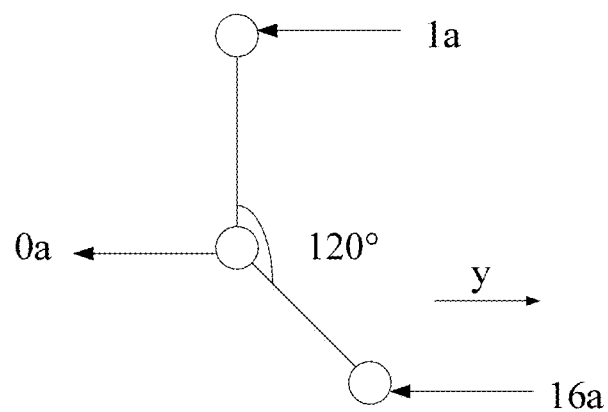
FIG. 3D is a partial side view of a second skeleton posture according to an embodiment of this application.

FIG. 3D is a partial side view of a second skeleton posture. As shown in FIG. 3D, there is an angle between a skeleton between the spine base joint 0$a$ and the right hip joint 16$a$ and a skeleton between the spine base joint 0$a$ and the middle spine joint 1$a$. The angle may be 120°. A direction (a direction y in FIG. 3D) in which the skeleton between the spine base joint 0$a$ and the right hip joint 16$a$ protrudes relative to the skeleton between the spine base joint 0$a$ and the middle spine joint 1$a$ is the front orientation indicated by the human body orientation information.

e4. The electronic device obtains a human skeleton length set.

The human body skeleton length set includes a skeleton length corresponding to each skeleton. A manner in which the electronic device obtains the human skeleton length set is similar to the manner in which the electronic device obtains the skeleton length range set, and details are not described in this embodiment of this application.

f4. The electronic device determines a length of a skeleton between a fifth joint and a parent joint of the fifth joint based on the human skeleton length set, where the fifth joint is any joint, having a parent joint, of the at least one joint corresponding to the second skeleton posture.

g4. The electronic device determines location information of another joint in the second skeleton posture different from the second preset joint based on the length of the skeleton between the fifth joint and the parent joint of the fifth joint, the front orientation indicated by the human body orientation information, and the location information of the correct joint of the at least one target joint.

Step g4 may include the following sub-steps.

g41. The electronic device determines, based on the front orientation indicated by the human body orientation information, angle range information of a joint, having a child joint, of the other joint that is in the at least one joint corresponding to the second skeleton posture and that is different from the second preset joint.

Usually, a motion range in which a human joint moves towards the front side of the human body trunk is different from a motion range in which the human joint moves towards a reverse side of the human body trunk. Therefore, in step g1, the electronic device may determine, based on the front orientation indicated by the human body orientation information, angle range information of a joint, having a child joint, of the other joint that is in the at least one joint corresponding to the second skeleton posture and that is different from the second preset joint.

Angle range information of a joint A, having a child joint, of the at least one joint corresponding to the second skeleton posture is used to indicate a range of a rotation angle of a skeleton between the joint A and each of n (n is a positive integer greater than or equal to 1) child joints of the joint A relative to the joint A. A definition of the rotation angle of the skeleton between the joint A and each of the n child joints of the joint A relative to the joint A is similar to a definition of the rotation angle of the skeleton between the first joint and each of the k child joints of the first joint relative to the first joint, and details are not described in this embodiment of this application.

It should be noted that in this embodiment of this application, a definition of a local coordinate system of the joint corresponding to the second skeleton posture may be the same as or different from the definition of the local coordinate system of the joint corresponding to the first skeleton posture. This is not limited in this embodiment of this application.

It should be further noted that the angle range information may be obtained based on human physiology data. For example, the angle range information may be obtained based on a motion range of each joint in a human body orthotopic method recommended by the American Surgical Association.

g42. Under a first constraint and a second constraint, the electronic device performs fitting based on a second formula to obtain angular information of a specified joint in the at least one joint corresponding to the second skeleton posture obtained when a reference value is the smallest.

The angular information of the specified joint is used to indicate a rotation angle of a skeleton between the specified joint and each of m (m is a positive integer greater than or equal to 1) child joints of the specified joint relative to the specified joint. A definition of the rotation angle is similar to the definition of the rotation angle of the skeleton between the first joint and each of the k child joints of the first joint relative to the first joint, and details are not described in this embodiment of this application.

The second formula is:

$$y = \sum_{i=0}^{n} \left[ \omega_i (PJ_{i,t}^0 - PJ_{i,t}^{ob})^2 + (1 - \omega_i) \| OJ_{j,t}^0 - OJ_{j,t-1}^0 \|^2 \right],$$

where y is the reference value, and the reference value is used to represent a similarity between the second skeleton posture and the first skeleton posture, $PJ_{i,t}^{ob}$ is location information of an $i^{th}$ target joint, different from the first preset joint, of the at least one target joint, $PJ_{i,t}^0$ is location information of the specified joint, where the specified joint is a joint, corresponding to the $i^{th}$ target joint, of the at least one joint corresponding to the second skeleton posture, $OJ_{j,t}^0$ is angular information of a parent joint of the specified joint, and $OJ_{j,t-1}^0$ is angular information of a parent joint of a joint, corresponding to the specified joint, in a fourth skeleton posture, where the fourth skeleton posture is obtained by performing fitting based on the third skeleton posture, and when the $i^{th}$ target joint is the correct joint, $\omega_i$ is equal to 1, or when the $i^{th}$ target joint is not the correct joint, $\omega_i$ is equal to 0, where n is a quantity of joints, different from the second preset joint, of the at least one joint corresponding to the second skeleton posture.

The first constraint is that the angular information of the specified joint obtained through fitting ensures that an angle indicated by the angular information of the parent joint of the specified joint falls within an angle range indicated by angle range information of the parent joint of the specified joint. The second constraint is that the angular information of the specified joint obtained through fitting ensures that the length of the skeleton between the specified joint and the parent joint of the specified joint is equal to a length of a skeleton between the specified joint and the parent joint of the specified joint in the pre-obtained human body skeleton length set.

g43. The electronic device determines the location information of the specified joint based on the angular information of the specified joint and a length of a skeleton between the specified joint and the parent joint of the specified joint in the pre-obtained human body skeleton length set.

Step 306. The electronic device recognizes a human body posture based on the second skeleton posture.

The electronic device recognizes the human body posture reflected by the human body posture image in the first depth image based on the second skeleton posture.

It should be noted that both the first skeleton posture and the second skeleton posture in the skeleton posture determining method provided in the foregoing embodiment are three-dimensional skeleton postures. In actual application, the skeleton posture determining method provided in the foregoing embodiment may be also applied to a two-dimensional skeleton posture, that is, when the first skeleton posture and the second skeleton posture are two-dimensional skeleton postures, the skeleton posture determining method provided in the foregoing embodiment is also applicable.

In summary, according to the skeleton posture determining method provided in this embodiment of this application, the first skeleton posture is obtained, where the first skeleton posture includes the location information of the plurality of joints, the location information of the correct joint is obtained from the first skeleton posture through screening, and the second skeleton posture is obtained by performing fitting using the location information of the correct joint. This can ensure that the second skeleton posture does not include location information of an erroneous joint. Therefore, accuracy of recognizing a human body posture using the second skeleton posture is relatively high.

The following are apparatus embodiments of this application, and an apparatus may be configured to perform the method embodiment of this application. For details not disclosed in the apparatus embodiments of this application, refer to the method embodiment of this application.

Figure 4:
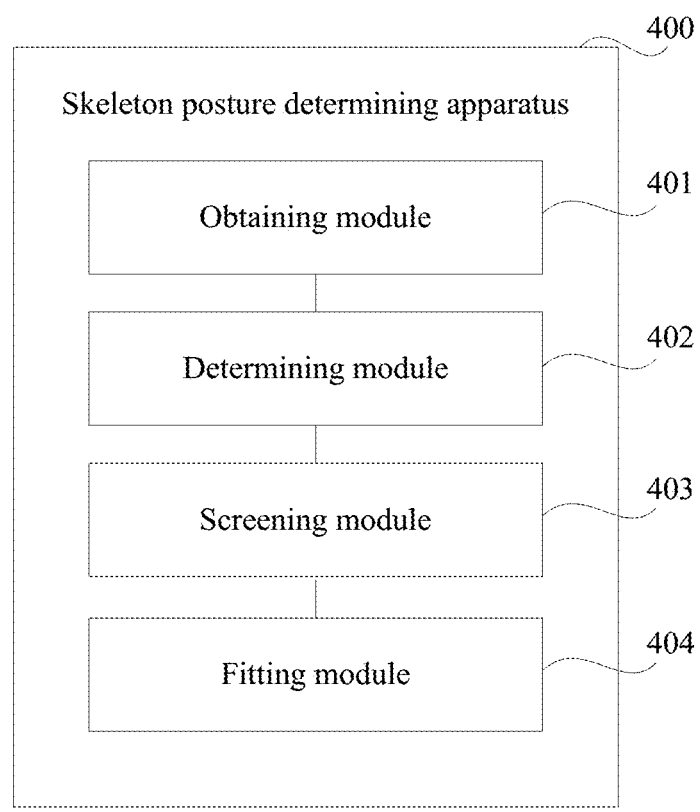
FIG. 4 is a block diagram of a skeleton posture determining apparatus according to an embodiment of this application.

FIG. 4 is a block diagram of a skeleton posture determining apparatus 400 according to an embodiment of this application. Referring to FIG. 4, the skeleton posture determining apparatus 400 may include an obtaining module 401, a determining module 402, a screening module 403, and a fitting module 404.

The obtaining module 401 is configured to obtain a first skeleton posture, where the first skeleton posture includes location information of a plurality of joints. Optionally, the obtaining module 401 is configured to perform the technical processes of steps 301 and 302 in the foregoing embodiment.

The determining module 402 is configured to determine a description parameter of at least one target joint of the plurality of joints, where the description parameter includes location information of each of the at least one target joint. Optionally, the determining module 402 is configured to perform the technical process of step 303 in the foregoing embodiment.

The screening module 403 is configured to obtain, through screening, a correct joint from the at least one target joint based on the description parameter. Optionally, the screening module 403 is configured to perform the technical process of step 304 in the foregoing embodiment.

The fitting module 404 is configured to perform fitting based on location information of the correct joint, to obtain the second skeleton posture, where the second skeleton posture includes location information of at least one joint, and the at least one target joint is in a one-to-one correspondence with the at least one joint. Optionally, the fitting module 404 is configured to perform the technical process of step 305 in the foregoing embodiment.

Figure 5:
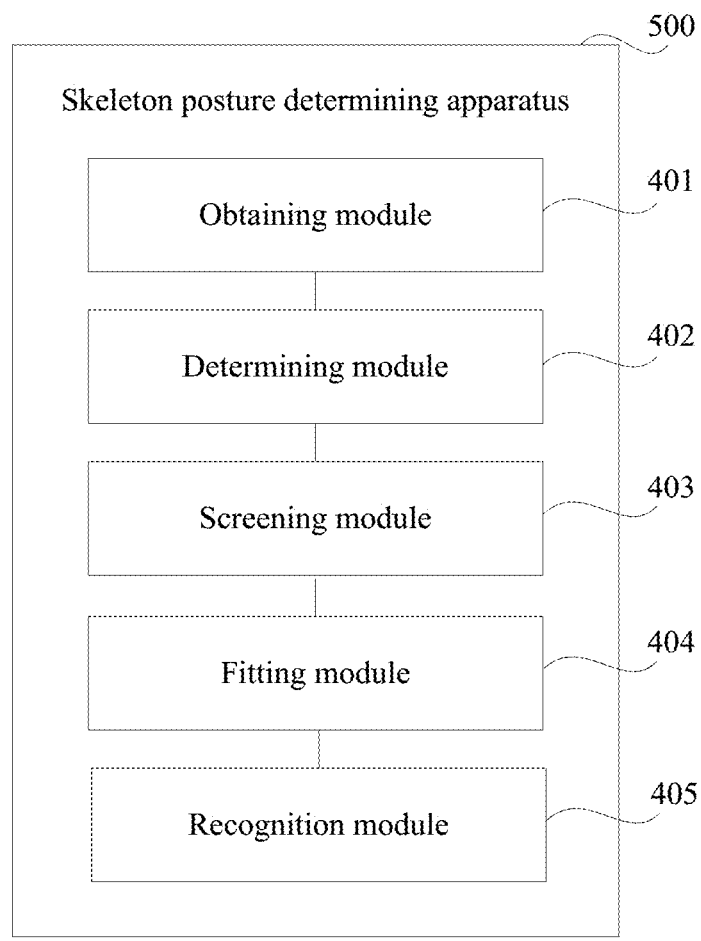
FIG. 5 is a block diagram of a skeleton posture determining apparatus according to an embodiment of this application.

FIG. 5 is a block diagram of a skeleton posture determining apparatus 500 according to an embodiment of this application. In addition to the modules included in the skeleton posture determining apparatus 400, the skeleton posture determining apparatus 500 may further include a recognition module 405.

The recognition module 405 is configured to recognize a human body posture based on the second skeleton posture. Optionally, the recognition module 405 is configured to perform the technical process of step 306 in the foregoing embodiment.

In summary, the skeleton posture determining apparatus 400 and 500 provided in the embodiments of this application obtains the first skeleton posture, where the first skeleton posture includes the location information of the plurality of joints, obtains, through screening, the location information of the correct joint from the first skeleton posture, and obtains the second skeleton posture by performing fitting using the location information of the correct joint. This can ensure that the second skeleton posture does not include location information of an erroneous joint. Therefore, accuracy of recognizing a human body posture using the second skeleton posture is relatively high.

Figure 6:
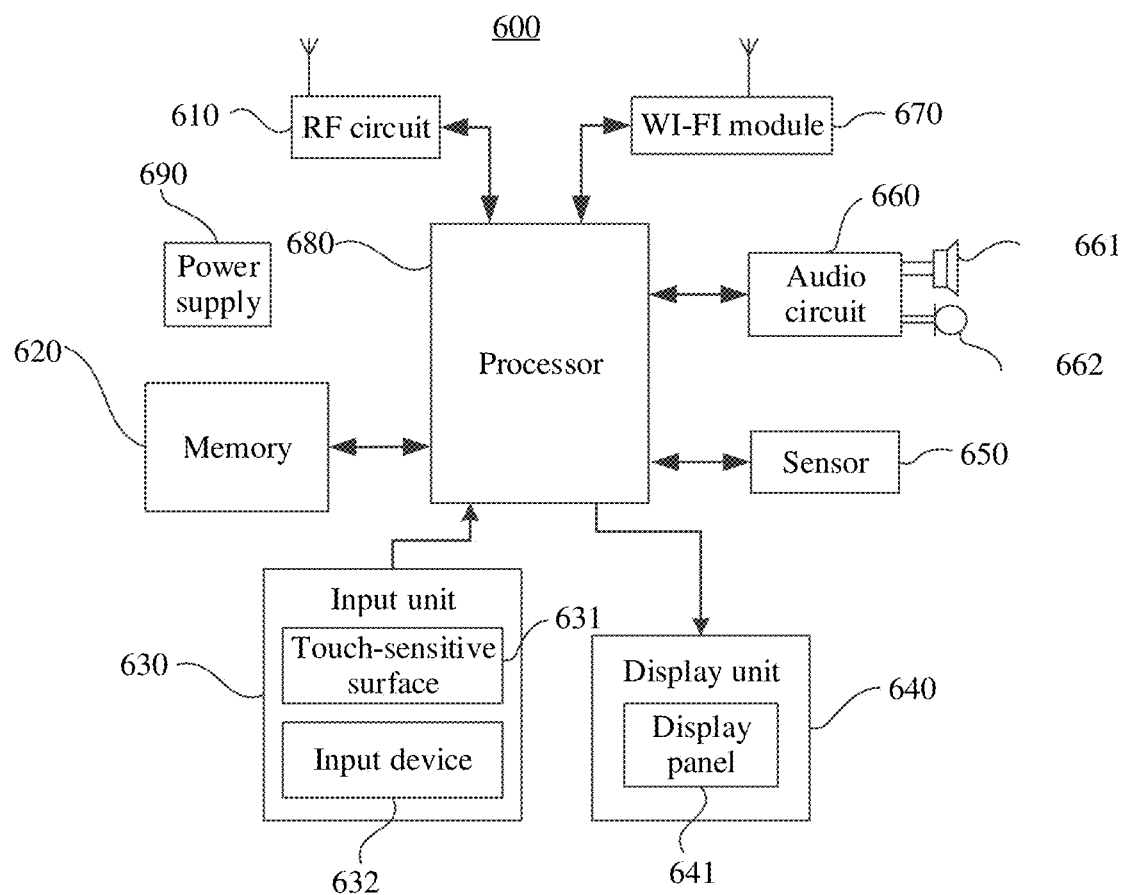
FIG. 6 is a block diagram of a skeleton posture determining apparatus according to an embodiment of this application.

An embodiment of this application provides a skeleton posture determining apparatus 600. The skeleton posture determining apparatus 600 may be configured to perform the skeleton posture determining method provided in the foregoing embodiments. Referring to FIG. 6, the skeleton posture determining apparatus 600 includes the following.

The skeleton posture determining apparatus 600 may include components such as a Radio Frequency (RF) circuit 610, a memory 620 including one or more computer readable storage media, an input unit 630, a display unit 640, a sensor 650, an audio circuit 660, a WI-FI module 670, a processor 680 including one or more processing cores, and a power supply 690. A person skilled in the art may understand that a structure of the skeleton posture determining apparatus shown in FIG. 6 does not constitute any limitation to the skeleton posture determining apparatus, and may include more or fewer components than those shown in the figure, or a combination of some components, or components disposed differently.

The RF circuit 610 may be configured to receive and send a signal during receiving or sending of information or in a call process. In particular, the RF circuit 610 receives downlink information of a base station and then sends the downlink information to the one or more processors 680 for processing, and also sends related uplink data to the base station. Generally, the RF circuit 610 includes but is not limited to an antenna, at least one amplifier, a tuner, one or more oscillators, a subscriber identity module (SIM) card, a transceiver, a coupler, a Low Noise Amplifier (LNA), and a duplexer. In addition, the RF circuit 610 may also communicate with a network and other devices through wireless communication. The wireless communication may use any communications standard or protocol, including but not limited to Global System for Mobile communication (GSM), General Packet Radio Service (GPRS), Code Division Multiple Access (CDMA), Wideband CDMA (WCDMA), Long Term Evolution (LTE), email, and Short Message Service (SMS).

The memory 620 may be configured to store a software program and a module. The processor 680 runs the software program and module stored in the memory 620, to execute various function applications and process data. The memory 620 may mainly include a program storage area and a data storage area. The program storage area may store an operating system, an application program required by at least one function (such as a sound play function or an image play function), and the like, and the data storage area may store data (such as audio data and a phone book) created according to use of the skeleton posture determining apparatus 600, and the like. In addition, the memory 620 may include a high-speed random access memory (RAM), and may further include a non-volatile memory such as at least one disk storage device, a flash memory device, or another volatile solid-state storage device. Correspondingly, the memory 620 may further include a memory controller to provide access to the memory 620 for the processor 680 and the input unit 630.

The input unit 630 may be configured to receive entered digital or character information, and generate signal input, obtained using a keyboard, a mouse, a joystick, optics, or a trackball, related to user setting and function control. Further, the input unit 630 may include a touch-sensitive surface 631 and an input device 632. The touch-sensitive surface 631 is also referred to as a touch display screen or a touch panel, and may collect a touch operation (such as an operation performed by a user on the touch-sensitive surface 631 or near the touch-sensitive surface 631 using a finger or any proper object or accessory such as a stylus) performed by a user on or near the touch-sensitive surface 631, and drive a corresponding connecting apparatus according to a preset program. Optionally, the touch-sensitive surface 631 may include two components, a touch detection apparatus and a touch controller. The touch detection apparatus detects a touch location of the user, detects a signal generated by a touch operation, and transfers the signal to the touch controller. The touch controller receives touch information from the touch detection apparatus, converts the touch information into contact coordinates, and sends the contact coordinates to the processor 680, and can receive and execute a command sent by the processor 680. In addition, the touch-sensitive surface 631 may be implemented in a plurality of types such as a resistive type, a capacitive type, an infrared type, and a surface acoustic wave type. In addition to the touch-sensitive surface 631, the input unit 630 may further include the other input devices 632. Further, the other input devices 632 may include but are not limited to one or more of a physical keyboard, a function key (such as a volume control key or an on/off key), a trackball, a mouse, and a joystick.

The display unit 640 may be configured to display information entered by the user or information provided for the user, and various graphical user interfaces of the skeleton posture determining apparatus 600. These graphical user interfaces may include an image, a text, an icon, a video, or any combination thereof. The display unit 640 may include a display panel 641. Optionally, the display panel 641 may be configured in a form such as a Liquid Crystal Display (LCD) or an Organic Light-Emitting Diode (OLED). Further, the touch-sensitive surface 631 can cover the display panel 641. After detecting the operation on or near the touch-sensitive surface 631, the touch-sensitive surface 631 transmits the operation to the processor 680 in order to determine a type of a touch event, and then the processor 680 provides corresponding visual output on the display panel 641 according to the type of the touch event. Although in FIG. 6, the touch-sensitive surface 631 and the display panel 641 are used as two separate components to implement input and output functions, in some embodiments, the touch-sensitive surface 631 may be integrated with the display panel 641 to implement the input and output functions.

The skeleton posture determining apparatus 600 may further include at least one sensor 650, for example, a light sensor, a motion sensor, and another sensor. Further, the light sensor may include an ambient light sensor and a proximity sensor. The ambient light sensor may adjust luminance of the display panel 641 based on brightness of ambient light, and the proximity sensor may turn off the display panel 641 and/or backlight when the skeleton posture determining apparatus 600 moves close to an ear. As a motion sensor, a gravity accelerometer sensor may detect acceleration magnitudes in all directions (generally three axes), may detect a magnitude and a direction of gravity when being static, and may be applied to mobile-phone posture recognition application (for example, screen switching between landscape and portrait modes, related games, and magnetometer posture calibration), a vibration identification-related function (for example, a pedometer or knocking), and the like. Other sensors such as a gyroscope, a barometer, a hygrometer, a thermometer, and an infrared sensor that may also be configured in the skeleton posture determining apparatus 600 are not described herein.

The audio circuit 660, the loudspeaker 661, and the microphone 662 may provide an audio interface between the user and the skeleton posture determining apparatus 600. The audio circuit 660 may transmit, to the loudspeaker 661, an electrical signal that is converted from received audio data, and the loudspeaker 661 converts the electrical signal into a sound signal and outputs the sound signal. In addition, the microphone 662 converts a collected sound signal into an electrical signal, the audio circuit 660 receives the electrical signal, converts the electrical signal into audio data, and outputs the audio data to the processor 680 to perform processing, and then the audio data is sent to, for example, another skeleton posture determining apparatus, using the RF circuit 610, or the audio data is output to the memory 620 to perform further processing. The audio circuit 660 may further include an earplug jack, to provide communication between an external earphone and the skeleton posture determining apparatus 600.

WI-FI belongs to a short-distance wireless transmission technology. The skeleton posture determining apparatus 600 can assist, through the WI-FI module 670, the user in receiving and sending emails, browsing webpages, accessing streaming media and the like, and the WI-FI module 670 provides the user with wireless broadband Internet access. Although FIG. 6 shows the WI-FI module 670, it may be understood that the WI-FI module 670 is not a mandatory part of the skeleton posture determining apparatus 600, and may be omitted according to a requirement without changing the essence of the present disclosure.

The processor 680 is a control center of the skeleton posture determining apparatus 600 and is connected to each component of an entire mobile phone using various interfaces and circuits, and runs or executes the software program and/or module stored in the memory 620 and invokes data stored in the memory 620, to perform various functions of the skeleton posture determining apparatus 600 and process data in order to monitor the entire mobile phone. Optionally, the processor 680 may include one or more processing cores.

An application processor and a modem processor may be integrated into the processor 680. The application processor mainly processes an operating system, a user interface, an application program, and the like, and the modem processor mainly processes wireless communication. It can be understood that the modem processor may alternatively not be integrated into the processor 680.

The skeleton posture determining apparatus 600 further includes the power supply 690 (such as a battery) that supplies power to each component. The power supply may be logically connected to the processor 680 using a power supply management system such that functions such as charging management, discharging management, and power consumption management are implemented using the power supply management system. The power supply 690 may further include any component such as one or more direct current power supplies or alternating current power supplies, a recharging system, a power supply fault detection circuit, a power converter or a power inverter, or a power status indicator.

Although not shown, the skeleton posture determining apparatus 600 may further include a camera, a Bluetooth module, and the like. Details are not described herein. The skeleton posture determining apparatus further includes a memory and one or more programs. The one or more programs are stored in the memory, and are configured so as to be executed by one or more processors. The one or more programs are used to perform the skeleton posture determining method provided in the embodiment shown in FIG. 3A.

An embodiment of this application further provides a computer readable storage medium. The computer readable storage medium may be a non-volatile computer readable storage medium. The computer readable storage medium stores an instruction. When the instruction is run on a processing component of a computer, the processing component is enabled to perform the skeleton posture determining method provided in the embodiment shown in FIG. 3A.

A person of ordinary skill in the art may understand that all or some of the steps of the embodiments may be implemented by hardware or by a program instructing related hardware. The program may be stored in a computer readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A skeleton posture determining method, comprising:
obtaining a first skeleton posture, wherein the first skeleton posture comprises location information of a plurality of joints;
obtaining a description parameter of at least one target joint of the joints, wherein the description parameter comprises location information of each of the at least one target joint;
obtaining, through screening, a correct joint from the at least one target joint based on the description parameter; and
performing fitting based on location information of the correct joint to obtain a second skeleton posture, wherein the second skeleton posture comprises location information of at least one joint, wherein the at least one target joint is in a one-to-one correspondence with the at least one joint, wherein the second skeleton posture comprises human body orientation information indicating an orientation of a front side of a human body trunk in a human body posture corresponding to the second skeleton posture in a world coordinate system, and wherein performing fitting based on the location information of the correct joint comprises:

obtaining location information of a first preset joint, wherein the first preset joint is a target joint of the at least one target joint;

determining the location information of the first preset joint as location information of a second preset joint in the second skeleton posture;

determining an orientation of the front side of the human body trunk in a human body posture corresponding to the first skeleton posture in the world coordinate system as a front orientation indicated by the human body orientation information;

determining a length of a skeleton between a specified joint and a parent joint of the specified joint based on a pre-obtained human body skeleton length set, wherein the specified joint is any joint, having a parent joint, of the at least one joint; and determining location information of another joint in the second skeleton posture different from the second preset joint based on the length of the skeleton between the specified joint and the parent joint of the specified joint, the front orientation indicated by the human body orientation information, and the location information of the correct joint.

2. The skeleton posture determining method of claim 1, wherein the description parameter further comprises angular information of a target joint, having a child joint, of the at least one target joint, wherein angular information of a first joint indicates a rotation angle of a skeleton between the first joint and each of k child joints relative to the first joint, wherein the first joint is any target joint, having a child joint, of the at least one target joint, wherein the first joint has the k child joints, and wherein k is a positive integer greater than or equal to one.

3. The skeleton posture determining method of claim 2, wherein a rotation angle of a skeleton a between the first joint and an $i^{th}$ child joint of the k child joints relative to the first joint comprises a first Euler angle, a second Euler angle, and a third Euler angle, wherein one ≤i≤k, wherein the first Euler angle is an angle formed by rotating the skeleton a around an x-axis in a local coordinate system of the first joint, wherein the second Euler angle is an angle formed by rotating the skeleton a around a y-axis in the local coordinate system, and wherein the third Euler angle is an angle formed by rotating the skeleton a around a z-axis in the local coordinate system.

4. The skeleton posture determining method of claim 3, wherein the first skeleton posture further comprises location information of a spine, wherein the joints comprise a head joint, wherein an origin of the local coordinate system is a central point of the first joint, and wherein an orientation of the local coordinate system comprises either:

a direction of the y-axis is a direction from the first joint to a parent joint of the first joint, a direction of the z-axis is a direction of a cross product of a unit direction vector of the y-axis and a unit direction vector of a vector directed from the parent joint of the first joint to a second-level parent joint of the first joint, and a direction of the x-axis is a direction of a cross product of the unit direction vector of the y-axis and a unit direction vector of the z-axis when the first joint has the second-level parent joint; or the direction of the y-axis is the direction from the first joint to the parent joint of the first joint, the z-axis is parallel to the spine and points to the head joint, and the direction of the x-axis is the direction of the cross product of the unit direction vector of the y-axis and the unit direction vector of the z-axis when the first joint has the parent joint and does not have the second-level parent joint.

5. The skeleton posture determining method of claim 3, further comprising calculating a projected angle of the first Euler angle, a projected angle of the second Euler angle, and a projected angle of the third Euler angle based on a first formula group, and wherein the first formula group is:

$$\begin{cases} \alpha_{ijk} = \text{sign}(\alpha) \times \cos^{-1}\left(\frac{\vec{n_y} \cdot \vec{prj_x}(\vec{J_jJ_i})}{\|\vec{prj_x}(\vec{J_jJ_i})\|}\right) \\ \beta_{ijk} = \text{sign}(\beta) \times \cos^{-1}\left(\frac{\vec{n_z} \cdot \vec{prj_y}(\vec{J_jJ_i})}{\|\vec{prj_y}(\vec{J_jJ_i})\|}\right) ; \\ \gamma_{ijk} = \text{sign}(\gamma) \times \cos^{-1}\left(\frac{\vec{n_x} \cdot \vec{prj_z}(\vec{J_jJ_i})}{\|\vec{prj_z}(\vec{J_jJ_i})\|}\right) \end{cases}$$

$$\text{sign}(\alpha) = \begin{cases} 1, & \frac{\vec{n_y} \times \vec{prj_x}(\vec{J_jJ_i})}{\|\vec{n_y} \times \vec{prj_x}(\vec{J_jJ_i})\|} = \vec{n_x} \\ -1, & \frac{\vec{n_y} \times \vec{prj_x}(\vec{J_jJ_i})}{\|\vec{n_y} \times \vec{prj_x}(\vec{J_jJ_i})\|} = -\vec{n_x} \end{cases} ;$$

$$\text{sign}(\beta) = \begin{cases} 1, & \frac{\vec{n_z} \times \vec{prj_y}(\vec{J_jJ_i})}{\|\vec{n_z} \times \vec{prj_y}(\vec{J_jJ_i})\|} = \vec{n_y} \\ -1, & \frac{\vec{n_z} \times \vec{prj_y}(\vec{J_jJ_i})}{\|\vec{n_z} \times \vec{prj_y}(\vec{J_jJ_i})\|} = -\vec{n_y} \end{cases} ; \text{ and}$$

$$\text{sign}(\gamma) = \begin{cases} 1, & \frac{\vec{n_x} \times \vec{prj_z}(\vec{J_jJ_i})}{\|\vec{n_x} \times \vec{prj_z}(\vec{J_jJ_i})\|} = \vec{n_z} \\ -1, & \frac{\vec{n_x} \times \vec{prj_z}(\vec{J_jJ_i})}{\|\vec{n_x} \times \vec{prj_z}(\vec{J_jJ_i})\|} = -\vec{n_z} \end{cases} ,$$

wherein $\alpha_{ijk}$ is the projected angle of the first Euler angle, wherein $\beta_{ijk}$ is the projected angle of the second Euler angle, wherein $\gamma_{ijk}$ is the projected angle of the third Euler angle, wherein $\vec{n}_x$ is a unit direction vector of the x-axis, wherein $\vec{n}_y$ is a unit direction vector of the y-axis, wherein $\vec{n}_z$ is a unit direction vector of the z-axis, wherein $\vec{prj_x}(\vec{J_jJ_i})$ is a projected vector of projecting a target vector to a plane yz in the local coordinate system, wherein $\vec{prj_y}(\vec{J_jJ_i})$ is a projected vector of projecting the target vector to a plane xz in the local coordinate system, wherein $\vec{prj_z}(\vec{J_jJ_i})$ is a projected vector of projecting the target vector to a plane xy in the local coordinate system, and wherein the target vector is a vector directed from the first joint to the $i^{th}$ child joint.

6. The skeleton posture determining method of claim 2, wherein obtaining the correct joint comprises:

determining that an angle indicated by the angular information of the first joint falls within a preset angle range;

determining that the first joint is an erroneous joint in response to the determining that the angle indicated by the angular information of the first joint is beyond the preset angle range; and determining the correct joint based on the erroneous joint.

7. The skeleton posture determining method of claim 1, wherein obtaining the correct joint comprises:

determining a length of a skeleton between a third joint and a parent joint of the third joint based on location information of the third joint and location information of the parent joint of the third joint, wherein the third joint is any target joint, having a parent joint, of the at least one target joint;

determining that the length of the skeleton between the third joint and the parent joint of the third joint is beyond a pre-obtained skeleton length range;

determining that the third joint is an erroneous joint in response to the determining that the length of the skeleton between the third joint and the parent joint of the third joint is beyond the pre-obtained skeleton length range; and determining the correct joint based on the erroneous joint.

8. The skeleton posture determining method of claim 1, wherein obtaining the first skeleton posture comprises:

obtaining a human body motion video, wherein the human body motion video comprises a plurality of video frames, and wherein each of the video frames comprises a human body posture image;

obtaining a depth image corresponding to each of the video frames; and obtaining the first skeleton posture based on a first depth image corresponding to a first video frame, wherein the first video frame is any one of the video frames.

9. The skeleton posture determining method of claim 8, wherein a pixel value of a human body posture image in the first depth image is different from a pixel value of a non-human-body posture image, and wherein obtaining the correct joint comprises:

determining, based on location information of a second joint, two-dimensional coordinates of the second joint in an image coordinate system of the first depth image, wherein the second joint is any one of the at least one target joint;

determining a pixel value sum of at least one pixel within a preset range around the two-dimensional coordinates;

determining that the pixel value sum is beyond a preset pixel-value-sum range;

determining that the second joint is an erroneous joint in response to the determining that the pixel value sum is beyond the preset pixel-value-sum range; and determining the correct joint based on the erroneous joint.

10. The skeleton posture determining method of claim 8, wherein the first video frame is a $t^{th}$ video frame of the video frames, wherein t is a positive integer greater than one, and wherein obtaining the correct joint comprises:

obtaining a third skeleton posture based on a second depth image corresponding to a $(t-1)^{th}$ video frame of the video frames, wherein the third skeleton posture comprises location information of a plurality of preset joints, and wherein the preset joints are in a one-to-one correspondence with the joints;

obtaining location information of a fourth joint from the third skeleton posture, wherein the fourth joint corresponds to a second joint, and wherein the second joint is any one of the at least one target joint;

obtaining a distance between location coordinates indicated by the location information of the fourth joint and location coordinates indicated by location information of the second joint;

determining that the distance is greater than a preset distance threshold;

determining that the second joint is an erroneous joint in response to the determining that the distance is greater than the preset distance threshold; and determining the correct joint based on the erroneous joint.

11. The skeleton posture determining method of claim 1, wherein the first preset joint is a root joint, wherein the root joint is a joint that does not have a parent joint, wherein the second preset joint is the root joint, wherein the human body orientation information comprises location information of a spine and location information of two hip joints, and wherein the front orientation indicated by the human body orientation information is a direction in which the two hip joints protrude relative to the spine.

12. The skeleton posture determining method of claim 1, wherein before determining the orientation of the front side of the human body trunk as the front orientation indicated by the human body orientation information, the skeleton posture determining method further comprises:

determining an orientation of a tiptoe in the human body posture corresponding to the first skeleton posture in the world coordinate system; and determining the orientation of the tiptoe in the world coordinate system as the orientation of the front side of the human body trunk in the human body posture corresponding to the first skeleton posture in the world coordinate system.

13. The skeleton posture determining method of claim 12, wherein determining the orientation of the tiptoe in the human body posture comprises:

obtaining a point cloud in a human foot image of a first depth image, wherein the first skeleton posture is obtained based on the first depth image;

projecting the point cloud onto a plane xy in the world coordinate system, wherein the plane xy is parallel to a plane on which a ground in the first depth image is located;

obtaining a main feature vector of the projected point cloud; and determining a direction of the main feature vector as the orientation of the tiptoe in the human body posture corresponding to the first skeleton posture in the world coordinate system.

14. The skeleton posture determining method of claim 1, wherein before determining the orientation of the front side of the human body trunk as the front orientation indicated by the human body orientation information, the skeleton posture determining method further comprises:

determining an orientation of a human face in the human body posture corresponding to the first skeleton posture in the world coordinate system; and determining the orientation of the human face in the world coordinate system as the orientation of the front side of the human body trunk in the human body posture corresponding to the first skeleton posture in the world coordinate system.

15. The skeleton posture determining method of claim 1, wherein determining the location information of the other joint in the second skeleton posture different from the second preset joint comprises:

determining, based on the front orientation indicated by the human body orientation information, angle range information of a joint, having a child joint, of the other joint in the at least one joint different from the second preset joint;
determining that a reference value is a smallest;
performing, under a first constraint and a second constraint, fitting based on a second formula to obtain angular information of a specified joint obtained in response to the determining that the reference value is the smallest, wherein the second formula is:

$$y = \sum_{i=0}^{n} \left[ \omega_i (PJ_{i,t}^0 - PJ_{i,t}^{ob})^2 + (1-\omega_i) \|OJ_{j,t}^0 - OJ_{j,t-1}^0\|^2 \right],$$

wherein y is the reference value representing a similarity between the second skeleton posture and the first skeleton posture, wherein $PJ_{i,t}^{ob}$ is location information of an $i^{th}$ target joint of the at least one target joint different from the first preset joint, wherein $PJ_{i,t}^0$ is location information of the specified joint in the second skeleton posture, wherein the specified joint is a joint corresponding to the $i^{th}$ target joint, wherein $OJ_{j,t}^0$ is angular information of a parent joint of the specified joint, wherein $OJ_{j,t-1}^0$ is angular information of a parent joint of a joint, corresponding to the specified joint, in a fourth skeleton posture, wherein the fourth skeleton posture is obtained by performing fitting based on a third skeleton posture, wherein the third skeleton posture is obtained based on a previous video frame of a video frame corresponding to the first skeleton posture, wherein w is equal to one in response to the $i^{th}$ target joint is the correct joint or $\omega_i$ is equal to zero in response to the $i^{th}$ target joint is not the correct joint, and wherein n is a quantity of joints of the at least one joint different from the second preset joint; and
determining the location information of the specified joint based on the angular information of the specified joint and a length of a skeleton between the specified joint and the parent joint of the specified joint, wherein the first constraint is that the angular information of the specified joint obtained through fitting ensures that an angle indicated by the angular information of the parent joint of the specified joint falls within an angle range indicated by angle range information of the parent joint of the specified joint, and wherein the second constraint is that the angular information of the specified joint obtained through fitting ensures that the length of the skeleton between the specified joint and the parent joint of the specified joint is equal to a length of a skeleton between the specified joint and the parent joint of the specified joint in the pre-obtained human body skeleton length set.

16. A skeleton posture determining apparatus, comprising:
at least one processor; and
a non-transitory computer-readable storage medium coupled to the at least one processor and storing programming instructions for execution by the at least one processor, wherein the programming instructions cause the at least one processor to be configured to:
obtain a first skeleton posture, wherein the first skeleton posture comprises location information of a plurality of joints;
determine a description parameter of at least one target joint of the joints, wherein the description parameter comprises location information of each of the at least one target joint;
obtain, through screening, a correct joint from the at least one target joint based on the description parameter;
perform fitting based on location information of the correct joint to obtain a second skeleton posture, wherein the second skeleton posture comprises location information of at least one joint, wherein the at least one target joint is in a one-to-one correspondence with the at least one joint, and wherein the second skeleton posture comprises human body orientation information indicating an orientation of a front side of a human body trunk in a human body posture corresponding to the second skeleton posture in a world coordinate system;
obtain location information of a first preset joint, wherein the first preset joint is a target joint of the at least one target joint;
determine the location information of the first preset joint as location information of a second preset joint in the second skeleton posture;
determine an orientation of the front side of the human body trunk in a human body posture corresponding to the first skeleton posture in the world coordinate system as a front orientation indicated by the human body orientation information;
determine a length of a skeleton between a specified joint and a parent joint of the specified joint based on a pre-obtained human body skeleton length set, wherein the specified joint is any joint, having a parent joint, of the at least one joint; and
determine location information of another joint in the second skeleton posture different from the second preset joint based on the length of the skeleton between the specified joint and the parent joint of the specified joint, the front orientation indicated by the human body orientation information, and the location information of the correct joint.

17. The skeleton posture determining apparatus of claim 16, wherein the description parameter further comprises angular information of a target joint, having a child joint, of the at least one target joint, wherein angular information of a first joint indicates a rotation angle of a skeleton between the first joint and each of k child joints relative to the first joint, wherein the first joint is any target joint, having a child joint, of the at least one target joint, wherein the first joint has the k child joints, and wherein k is a positive integer greater than or equal to one.

18. The skeleton posture determining apparatus of claim 17, wherein a rotation angle of a skeleton a between the first joint and an $i^{th}$ child joint of the k child joints relative to the first joint comprises a first Euler angle, a second Euler angle, and a third Euler angle, wherein one ≤i≤k, wherein the first Euler angle is an angle formed by rotating the skeleton a around an x-axis in a local coordinate system of the first joint, wherein the second Euler angle is an angle formed by rotating the skeleton a around a y-axis in the local coordinate system, and wherein the third Euler angle is an angle formed by rotating the skeleton a around a z-axis in the local coordinate system.

19. The skeleton posture determining apparatus of claim 18, wherein the first skeleton posture further comprises location information of a spine, wherein the joints comprise a head joint, wherein an origin of the local coordinate system is a central point of the first joint, and wherein an orientation of the local coordinate system comprises:
a direction of the y-axis is a direction from the first joint to a parent joint of the first joint, a direction of the z-axis is a direction of a cross product of a unit direction vector of the y-axis and a unit direction vector of a vector directed from the parent joint of the first joint to a second-level parent joint of the first joint, and a direction of the x-axis is a direction of a cross product of the unit direction vector of the y-axis and a unit direction vector of the z-axis when the first joint has the second-level parent joint; or the direction of the y-axis is the direction from the first joint to the parent joint of the first joint, the z-axis is parallel to the spine and points to the head joint, and the direction of the x-axis is the direction of the cross product of the unit direction vector of the y-axis and the unit direction vector of the z-axis when the first joint has the parent joint and does not have the second-level parent joint.

20. The skeleton posture determining apparatus of claim 18, wherein the programming instructions further cause the at least one processor to be configured to calculate a projected angle of the first Euler angle, a projected angle of the second Euler angle, and a projected angle of the third Euler angle based on a first formula group, and wherein the first formula group is:

$$\begin{cases} \alpha_{ijk} = \text{sign}(\alpha) \times \cos^{-1}\left(\frac{\vec{n_y} \cdot \overrightarrow{prj_x}(J_j J_i)}{\|\overrightarrow{prj_x}(J_j J_i)\|}\right) \\ \beta_{ijk} = \text{sign}(\beta) \times \cos^{-1}\left(\frac{\vec{n_z} \cdot \overrightarrow{prj_y}(J_j J_i)}{\|\overrightarrow{prj_y}(J_j J_i)\|}\right) \\ \gamma_{ijk} = \text{sign}(\gamma) \times \cos^{-1}\left(\frac{\vec{n_x} \cdot \overrightarrow{prj_z}(J_j J_i)}{\|\overrightarrow{prj_z}(J_j J_i)\|}\right) \end{cases} ;$$

$$\text{sign}(\alpha) = \begin{cases} 1, & \frac{\vec{n_y} \times \overrightarrow{prj_x}(J_j J_i)}{\|\vec{n_y} \times \overrightarrow{prj_x}(J_j J_i)\|} = \vec{n_x} \\ -1, & \frac{\vec{n_y} \times \overrightarrow{prj_x}(J_j J_i)}{\|\vec{n_y} \times \overrightarrow{prj_x}(J_j J_i)\|} = -\vec{n_x} \end{cases} ;$$

$$\text{sign}(\beta) = \begin{cases} 1, & \frac{\vec{n_z} \times \overrightarrow{prj_y}(J_j J_i)}{\|\vec{n_z} \times \overrightarrow{prj_y}(J_j J_i)\|} = \vec{n_y} \\ -1, & \frac{\vec{n_z} \times \overrightarrow{prj_y}(J_j J_i)}{\|\vec{n_z} \times \overrightarrow{prj_y}(J_j J_i)\|} = -\vec{n_y} \end{cases} ; \text{ and}$$

$$\text{sign}(\gamma) = \begin{cases} 1, & \frac{\vec{n_x} \times \overrightarrow{prj_z}(J_j J_i)}{\|\vec{n_x} \times \overrightarrow{prj_z}(J_j J_i)\|} = \vec{n_z} \\ -1, & \frac{\vec{n_x} \times \overrightarrow{prj_z}(J_j J_i)}{\|\vec{n_x} \times \overrightarrow{prj_z}(J_j J_i)\|} = -\vec{n_z} \end{cases} ,$$

wherein $\alpha_{ijk}$ is the projected angle of the first Euler angle, wherein $\beta_{ijk}$ is the projected angle of the second Euler angle, wherein $\gamma_{ijk}$ is the projected angle of the third Euler angle, wherein $\vec{n}_x$ is a unit direction vector of the x-axis, wherein $\vec{n}_y$ is a unit direction vector of the y-axis, wherein $\vec{n}_z$ is a unit direction vector of the z-axis, wherein $\overrightarrow{prj_x}(\vec{J_j J_i})$ is a projected vector of projecting a target vector to a plane yz in the local coordinate system, wherein $\overrightarrow{prj_y}(\vec{J_j J_i})$ is a projected vector of projecting the target vector to a plane xz in the local coordinate system, wherein $\overrightarrow{prj_z}(\vec{J_j J_i})$ is a projected vector of projecting the target vector to a plane xy in the local coordinate system, and wherein the target vector is a vector directed from the first joint to the $i^{th}$ child joint.

21. The skeleton posture determining apparatus of claim 17, wherein the programming instructions further cause the at least one processor to be configured to:
determine whether an angle indicated by the angular information of the first joint falls within a preset angle range;
determine that the first joint is an erroneous joint when the angle indicated by the angular information of the first joint is beyond the preset angle range; and
determine the correct joint based on the erroneous joint.

22. The skeleton posture determining apparatus of claim 16, wherein the programming instructions further cause the at least one processor to be configured to:
determine a length of a skeleton between a third joint and a parent joint of the third joint based on location information of the third joint and location information of the parent joint of the third joint, wherein the third joint is any target joint, having a parent joint, of the at least one target joint;
determine that the third joint is an erroneous joint when the length of the skeleton between the third joint and the parent joint of the third joint is beyond a pre-obtained skeleton length range; and
determine the correct joint based on the erroneous joint.

23. The skeleton posture determining apparatus of claim 16, wherein the programming instructions further cause the at least one processor to be configured to:
obtain a human body motion video, wherein the motion video comprises a plurality of video frames, and wherein each of the video frames comprises a human body posture image;
obtain a depth image corresponding to each of the video frames; and
obtain the first skeleton posture based on a first depth image corresponding to a first video frame, wherein the first video frame is any one of the video frames.

24. The skeleton posture determining apparatus of claim 23, wherein a pixel value of a human body posture image in the first depth image is different from a pixel value of a non-human-body posture image, and wherein the programming instructions further cause the at least one processor to be configured to:
determine, based on location information of a second joint, two-dimensional coordinates of the second joint in an image coordinate system of the first depth image, wherein the second joint is any one of the at least one target joint;
determine a pixel value sum of at least one pixel within a preset range around the two-dimensional coordinates in the first depth image;
determine that the second joint is an erroneous joint when the pixel value sum is beyond a preset pixel-value-sum range; and
determine the correct joint based on the erroneous joint.

25. The skeleton posture determining apparatus of claim 23, wherein the first video frame is a $t^{th}$ video frame of the video frames, wherein t is a positive integer greater than one, and wherein the programming instructions further cause the at least one processor to be configured to:
obtain a third skeleton posture based on a second depth image corresponding to a $(t-1)^{th}$ video frame of the video frames, wherein the third skeleton posture comprises location information of a plurality of preset joints, and wherein the preset joints are in a one-to-one correspondence with the joints;

obtain location information of a fourth joint from the third skeleton posture, wherein the fourth joint corresponds to a second joint, and wherein the second joint is any one of the at least one target joint;

obtain a distance between location coordinates indicated by the location information of the fourth joint and location coordinates indicated by location information of the second joint;

determine that the second joint is an erroneous joint when the distance is greater than a preset distance threshold; and determine the correct joint based on the erroneous joint.

26. The skeleton posture determining apparatus of claim 16, wherein the first preset joint is a root joint, wherein the root joint is a joint that does not have a parent joint, wherein the second preset joint is the root joint, wherein the human body orientation information comprises location information of a spine and location information of two hip joints, and wherein the front orientation indicated by the human body orientation information is a direction in which the two hip joints protrude relative to the spine.

27. The skeleton posture determining apparatus of claim 16, wherein the programming instructions further cause the at least one processor to be configured to:
determine an orientation of a tiptoe in the human body posture corresponding to the first skeleton posture in the world coordinate system; and
determine the orientation of the tiptoe in the world coordinate system as the orientation of the front side of the human body trunk in the human body posture corresponding to the first skeleton posture in the world coordinate system.

28. The skeleton posture determining apparatus of claim 27, wherein the programming instructions further cause the at least one processor to be configured to:
obtain a point cloud in a human foot image of a first depth image, wherein the first skeleton posture is obtained based on the first depth image;
project the point cloud onto a plane xy in the world coordinate system, wherein the plane xy is parallel to a plane on which the ground in the first depth image is located;
obtain a main feature vector of the projected point cloud; and
determine a direction of the main feature vector as the orientation of the tiptoe in the human body posture corresponding to the first skeleton posture in the world coordinate system.

29. The skeleton posture determining apparatus of claim 16, wherein the programming instructions further cause the at least one processor to be configured to:
determine an orientation of a human face in the human body posture corresponding to the first skeleton posture in the world coordinate system; and
determine the orientation of the human face in the world coordinate system as the orientation of the front side of the human body trunk in the human body posture corresponding to the first skeleton posture in the world coordinate system.

30. The skeleton posture determining apparatus of claim 16, wherein the programming instructions further cause the at least one processor to be configured to:
determine, based on the front orientation indicated by the human body orientation information, angle range information of a joint, having a child joint, of the other joint in the at least one joint different from the second preset joint;
perform, under a first constraint and a second constraint, fitting based on a second formula to obtain angular information of a specified joint obtained when a reference value is a smallest, wherein the second formula is:

$$y = \sum_{i=0}^{n} \left[ \omega_i (PJ_{i,t}^0 - PJ_{i,t}^{ob})^2 + (1 - \omega_i) \| OJ_{j,t}^0 - OJ_{j,t-1}^0 \|^2 \right],$$

wherein y is the reference value, wherein the reference value represents a similarity between the second skeleton posture and the first skeleton posture, wherein $PJ_{i,t}^{ob}$ is location information of an $i^{th}$ target joint of the at least one target joint different from the first preset joint, wherein $PJ_{i,t}^0$ is location information of the specified joint in the second skeleton posture, wherein the specified joint is a joint corresponding to the $i^{th}$ target joint, wherein $OJ_{j,t}^0$ is angular information of a parent joint of the specified joint, wherein $OJ_{j,t-1}^0$ is angular information of a parent joint of a joint, corresponding to the specified joint, in a fourth skeleton posture, wherein the fourth skeleton posture is obtained by performing fitting based on a third skeleton posture, wherein the third skeleton posture is obtained based on a previous video frame of a video frame corresponding to the first skeleton posture, and $\omega_i$ is equal to one when the $i^{th}$ target joint is the correct joint or $\omega_i$ is equal to zero when the $i^{th}$ target joint is not the correct joint, and wherein n is a quantity of joints, different from the second preset joint, of the at least one joint; and
determine the location information of the specified joint based on the angular information of the specified joint and a length of a skeleton between the specified joint and the parent joint of the specified joint, wherein the first constraint is that the angular information of the specified joint obtained through fitting ensures that an angle indicated by the angular information of the parent joint of the specified joint falls within an angle range indicated by angle range information of the parent joint of the specified joint, and wherein the second constraint is that the angular information of the specified joint obtained through fitting ensures that the length of the skeleton between the specified joint and the parent joint of the specified joint is equal to a length of a skeleton between the specified joint and the parent joint of the specified joint in the pre-obtained human body skeleton length set.

* * * * *

UNITED STATES PATENT AND TRADEMARK OFFICE
CERTIFICATE OF CORRECTION

PATENT NO.       : 10,963,682 B2
APPLICATION NO.  : 16/390835
DATED            : March 30, 2021
INVENTOR(S)      : Qiang Nie, Yixin Wu and Yunhui Liu It is certified that error appears in the above-identified patent and that said Letters Patent is hereby corrected as shown below:

In the Claims

Claim 15, Column 35, Line 31: "wherein w is equal to" should read "wherein $\omega_i$ is equal to"

Signed and Sealed this
Eleventh Day of May, 2021

Drew Hirshfeld
*Performing the Functions and Duties of the
Under Secretary of Commerce for Intellectual Property and
Director of the United States Patent and Trademark Office*